(12) United States Patent
Tatsu et al.

(10) Patent No.: US 8,036,091 B2
(45) Date of Patent: Oct. 11, 2011

(54) OPTICAL PICK-UP AND OPTICAL INFORMATION RECORDING AND REPRODUCING APPARATUS

(75) Inventors: Eriko Tatsu, Kokubunji (JP); Tatsuro Ide, Kawasaki (JP); Shigeharu Kimura, Yokohama (JP); Kazuyoshi Yamazaki, Yamato (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 0 days.

(21) Appl. No.: 12/834,055

(22) Filed: Jul. 12, 2010

(65) Prior Publication Data

US 2011/0013502 A1 Jan. 20, 2011

(30) Foreign Application Priority Data

Jul. 14, 2009 (JP) ................................. 2009-165676

(51) Int. Cl.
*G11B 7/00* (2006.01)

(52) U.S. Cl. ............................... 369/112.03; 369/44.11

(58) Field of Classification Search .............. 369/112.05
See application file for complete search history.

(56) References Cited

U.S. PATENT DOCUMENTS 6,185,167 B1 * 2/2001 Arai et al. ................... 369/44.23
7,151,735 B2 * 12/2006 Arai et al. ................. 369/112.05
2008/0094948 A1 4/2008 Kamisada et al.
2009/0185471 A1 7/2009 Yamazaki
2010/0061202 A1 3/2010 Yamazaki et al.

FOREIGN PATENT DOCUMENTS

| JP | 2006-283248 | 10/2006 |
|---|---|---|
| JP | 2007-289894 | 11/2007 |
| JP | 2008-287851 | 11/2008 |
| JP | 2010-61751 | 3/2010 |

* cited by examiner

*Primary Examiner* — Van N Chow
(74) *Attorney, Agent, or Firm* — Antonelli, Terry, Stout & Kraus, LLP.

(57) ABSTRACT

An optical pick-up which permits the relative position of a diffracting optical element and a photodetector to be adjusted by feedback control with signals which are generated when more than one kind of diffracted light differing in order is received, the diffracted light occurring as the reflected light from the optical disc is divided and diffracted by the diffracting optical element having multiple regions. The photodetector which detects the light beam passing through the central region of the diffracting optical element and generates RF signals is juxtaposed with sub-photodetectors, so that they receive reflected stray light from out-of-focus layers and perform computation to calculate the reflected stray light component which the RF signal detector receives, thereby detecting only the component of signals of the reflected light from a target layer.

10 Claims, 18 Drawing Sheets

FIG. 4
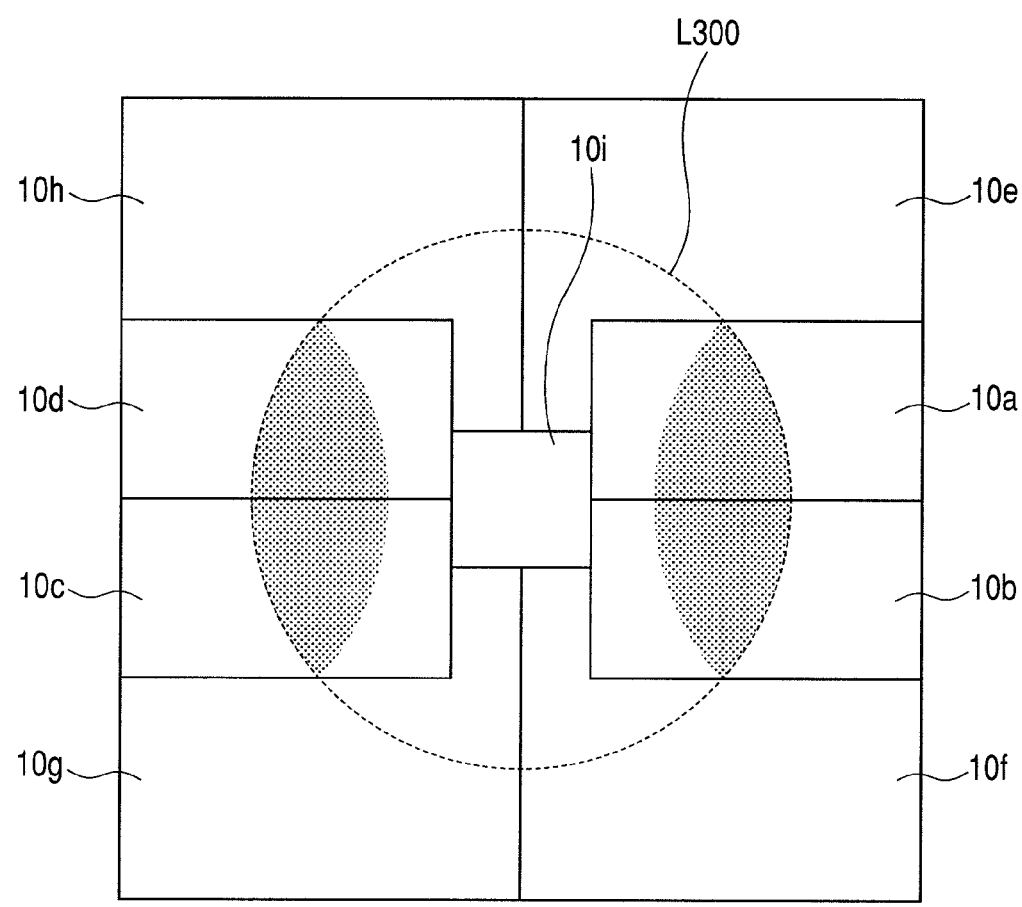
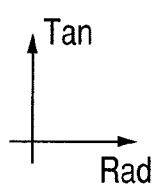

FIG. 6A
OUT OF FOCUS TOWARD LAYER 0
FIG. 6B
OUT OF FOCUS TOWARD LAYER 2
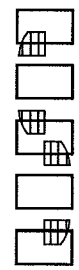
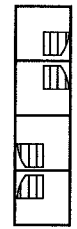
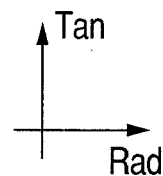
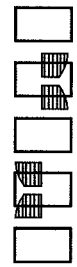
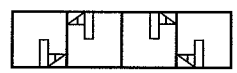
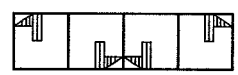

PATTERN OF STRAY LIGHT IN PHOTODETECTOR

OPTICAL PATH IN OPTICAL PICK-UP

STRAY LIGHT IN HOE

OPTICAL PATH IN OPTICAL PICK-UP

STRAY LIGHT IN HOE

PATTERN OF STRAY LIGHT IN PHOTODETECTOR GROUP

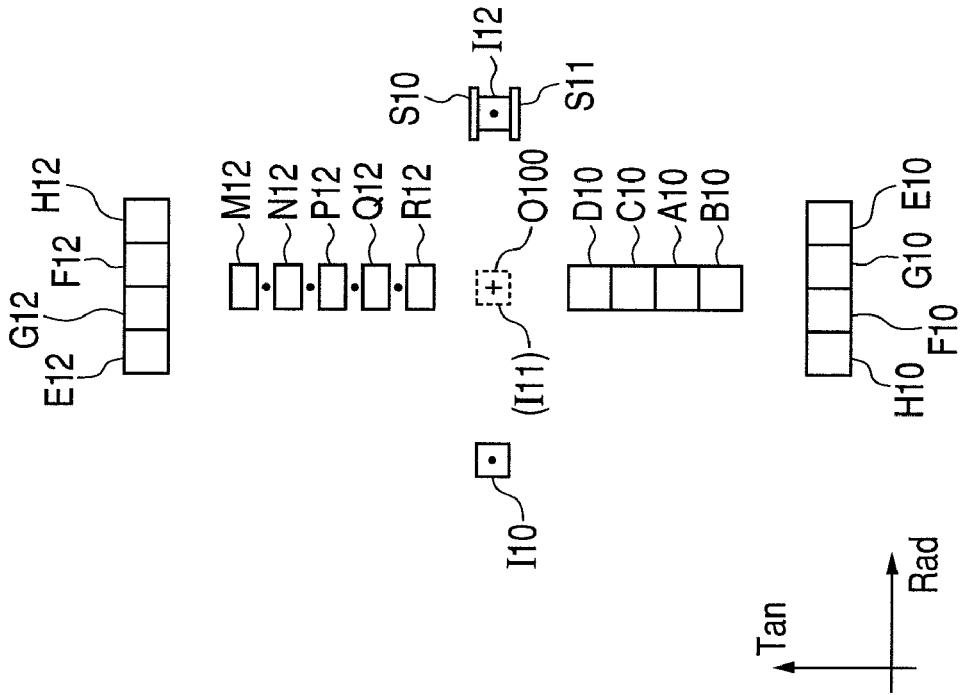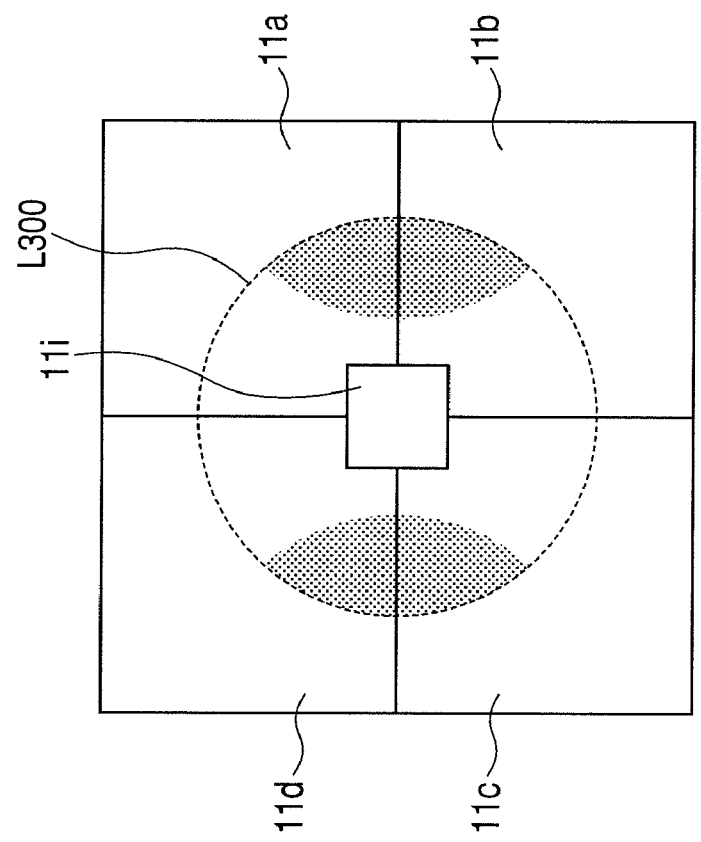

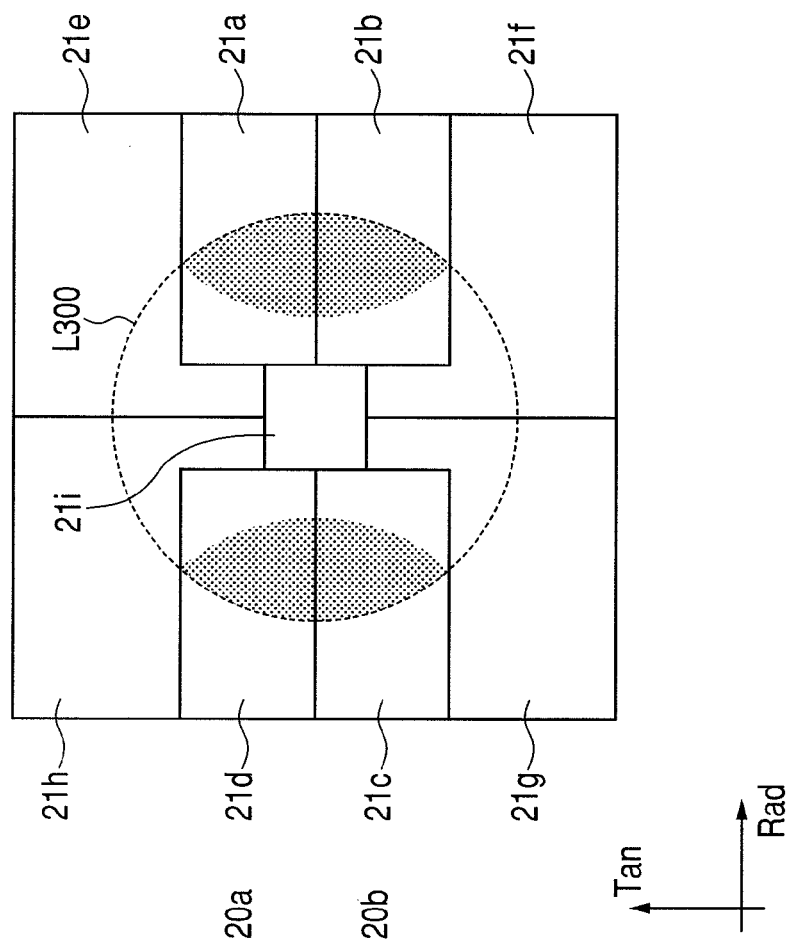
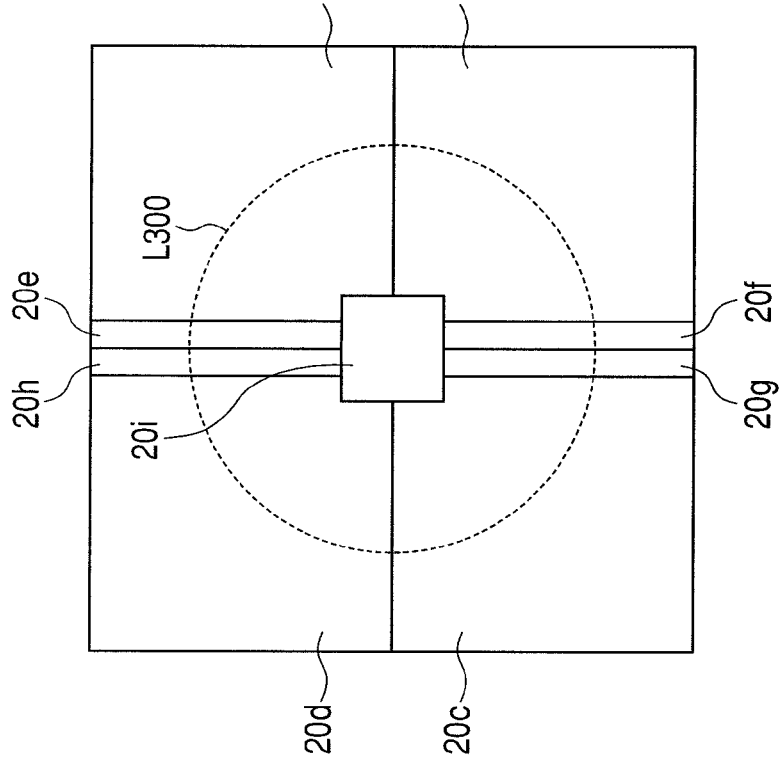

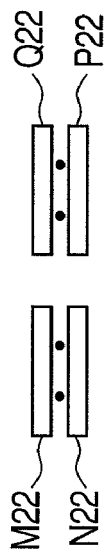
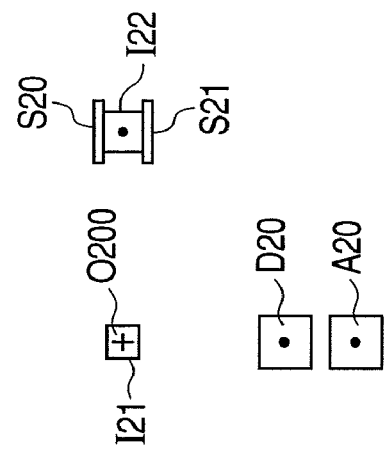
FIG. 11A
INSTANCE OF HOE FOR ASSEMBLING ADJUSTMENT AND DPD
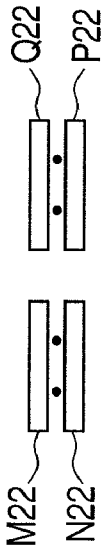
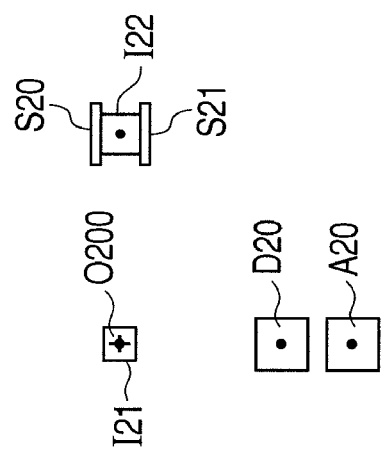
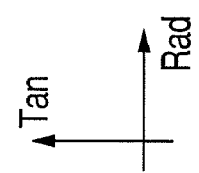
FIG. 11B
INSTANCE OF HOE FOR PP
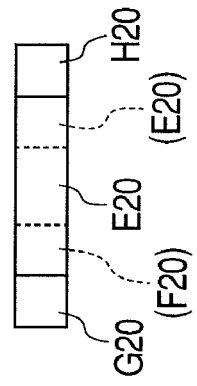

FIG. 12A
INSTANCE WHEN HOE FOR ASSEMBLING
ADJUSTMENT AND DPD WORKS
OUT OF FOCUS TOWARD LAYER 0
OUT OF FOCUS TOWARD LAYER 2
FIG. 12B
INSTANCE WHEN HOE FOR PP WORKS
OUT OF FOCUS TOWARD LAYER 0
OUT OF FOCUS TOWARD LAYER 2
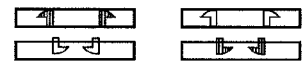
 
 
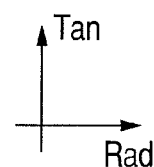

FIG. 13A
INSTANCE WHEN HOE FOR ASSEMBLING ADJUSTMENT AND DPD WORKS
FIG. 13B
INSTANCE WHEN HOE FOR PP WORKS
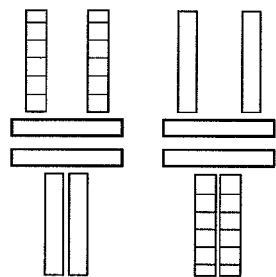
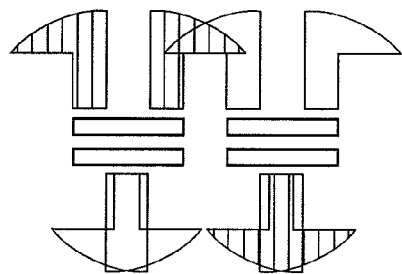
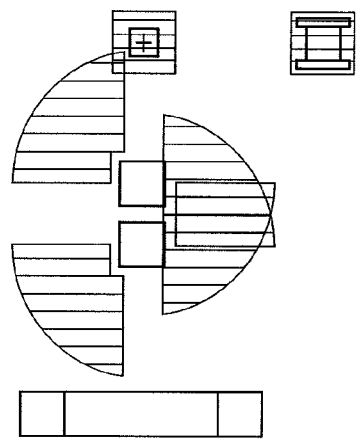
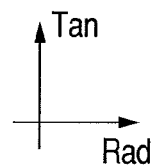
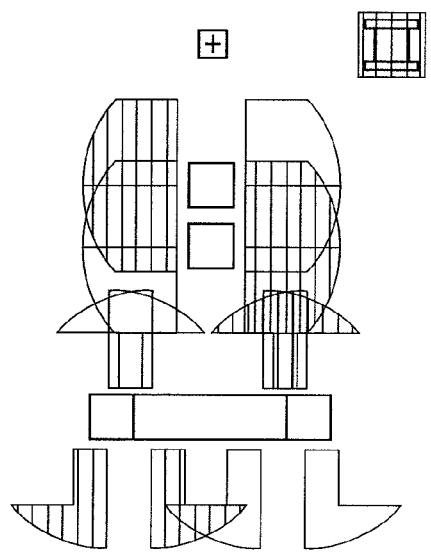
Tan ↑ → Rad

HOE FOR PP

HOE FOR ASSEMBLING ADJUSTMENT AND DPD

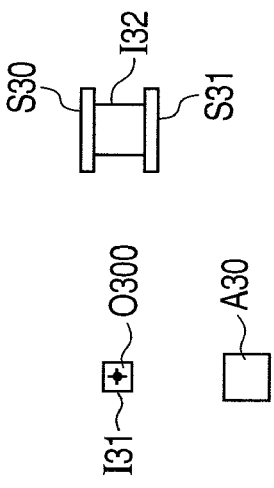
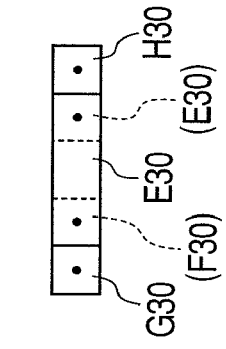
FIG. 15B
INSTANCE OF HOE FOR PP
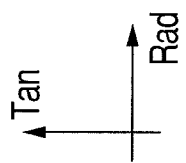
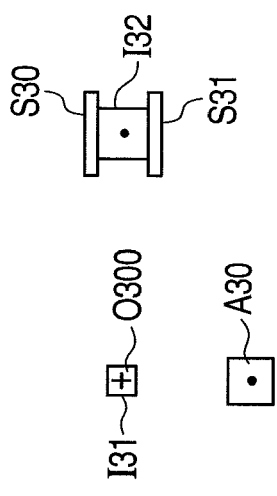
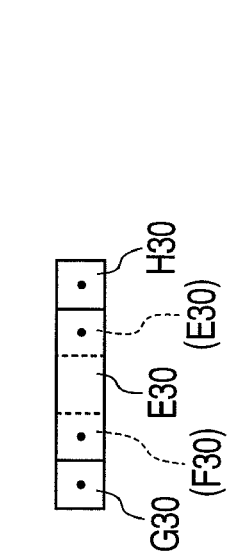
FIG. 15A
INSTANCE OF HOE FOR ASSEMBLING ADJUSTMENT AND DPD

FIG. 16A
INSTANCE WHEN HOE FOR ASSEMBLING ADJUSTMENT AND DPD WORKS
OUT OF FOCUS TOWARD LAYER 0
OUT OF FOCUS TOWARD LAYER 2
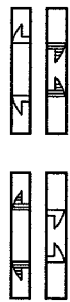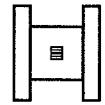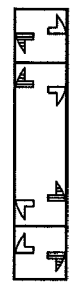
FIG. 16B
INSTANCE WHEN HOE FOR PP WORKS
OUT OF FOCUS TOWARD LAYER 0
OUT OF FOCUS TOWARD LAYER 2
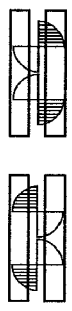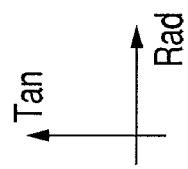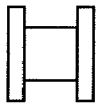
Tan ← Rad ↓

INSTANCE WHEN HOE FOR
ASSEMBLING ADJUSTMENT
AND DPD WORKS
FROM LAYER 0
FROM LAYER 2

INSTANCE WHEN HOE
FOR PP WORKS
FROM LAYER 0
FROM LAYER 2

FIG. 18A
INSTANCE OF HOE FOR ASSEMBLING ADJUSTMENT AND DPD
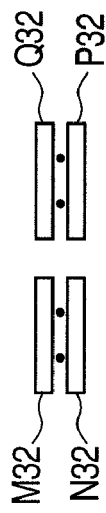
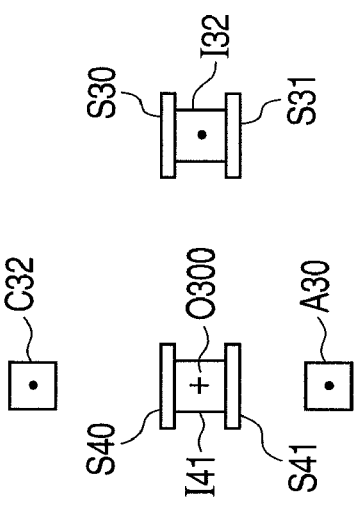
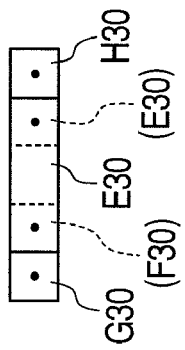
FIG. 18B
INSTANCE OF HOE FOR PP
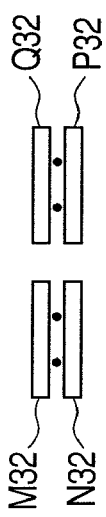
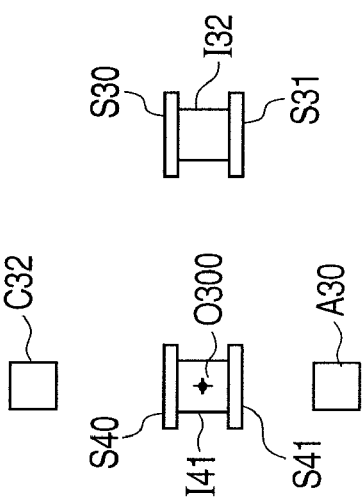
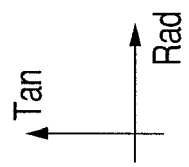
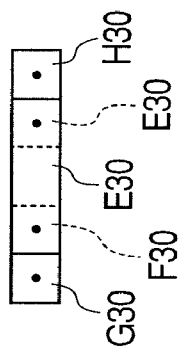

OPTICAL PICK-UP AND OPTICAL INFORMATION RECORDING AND REPRODUCING APPARATUS

CLAIM OF PRIORITY

The present application claims priority from Japanese patent application JP 2009-165676 filed on Jul. 14, 2009, the content of which is hereby incorporated by reference into this application.

FIELD OF THE INVENTION

The present invention relates to an optical pick-up and an optical information recording and reproducing apparatus. More particularly, the present invention relates to an optical pick-up for recording and reproducing on and from a multilayer optical disc having multiple recording layers, and also to an optical recording and reproducing apparatus equipped with the optical pick-up.

BACKGROUND OF THE INVENTION

Optical information recording and reproducing apparatuses are capable of recording and reproducing such information as music, images, and data on and from an optical disc.

The development of optical discs has recently reached commercialization of Blu-ray Disc (BD) which employs a blue semiconductor laser and a high-NA objective lens. This new technology, however, seems to have reached its limit in increasing the recording capacity through improvement of the resolving power of the optical system. A possible way to go beyond this limit is by multiplication of information recording layers in the optical disc. Unfortunately, the multi-player optical disc has a problem with interlayer cross talk between layers which adversely affects servo signals. The interlayer cross talk occurs because the photodetector receives reflected stray light from out-of-focus layers not engaged in recording and reproducing.

The optical disc apparatus is designed such that the reflected light from the optical disc is divided and diffracted into multiple light beams by a diffracting optical element, such as HOE (Holographic Optical Element), and the resulting light beams are received by a photodetector and the signals detected in response to the amount of light received generate reproducing RF signal (RFS: Radio Frequency Signal), focus error signal (FES: Focus Error Signal), and tracking error signal (TES: Tracking Error Signal). The detection of TES is accomplished by push-pull method (PP: Push-Pull) for the recoding type disc of BD-R (Blu-ray Disc-Recordable) and BD-RE (REwritable) or by Differential Phase Detection (PDP) method for BD-ROM (Read Only Memory). The signal detection and signal processing are switched according to the type of recording medium in use.

Japanese Patent Application No. 2006-283248, for example, discloses the use of the knife edge method for detection of focus error signals in the case of dual layer optical disc. According to this disclosure, the photodetector is arranged in such a way that reflected stray light from the out-of-focus layer does not illuminate the photodetector to detect servo signals. In order that the reflected stray light from the out-of-focus layer illuminates as little as possible the photodetector for servo signals, the diffracted light of first order or minus first order is detected mainly to generate RFS.

Also, Japanese Patent Application No. 2007-289894, for example, discloses the method for removing the stray light component that has illuminated the photodetector. According to this disclosure, the main photodetector to detect the reflected light from the optical disc, thereby generating RFS, TES, and FES, is juxtaposed with a secondary photodetector which detects only the reflected stray light from the out-of-focus layer. The secondary photodetector calculates stray light signals of the same degree as the reflected stray light received by the main photodetector so as to give a difference from the detected signal. In this way it is possible to detect stable TES free of stray light signal component from the target layer. The method disclosed in Japanese Patent Application No. 2007-289894 employs SSD (Spot Size Detection) for detection of focus error signals. The photodetector for SSD is positioned away from the photodetector for RFS and TES so that it does not receive the reflected stray light from the out-of-focus layer.

SUMMARY OF THE INVENTION

Unfortunately, the method disclosed in Japanese Patent Application No. 2006-283248 has the disadvantage of being incapable of detecting the diffracted light of zeroth order that has passed through the HOE. This causes difficulties in alignment of the HOE with the photodetector at the time of assembling the optical pick-up. For this reason, the foregoing method cannot be applied to any multilayer optical disc with three or more layers.

Also, the method disclosed in Japanese Patent Application No. 2007-289894 has the disadvantage that the RFS contains stray light components because the photodetector to mainly generate RFS receives both the reflected light from the target layer and the reflected stray light from the out-of-focus layer, which propagate along the same optical axis. Moreover, it has another disadvantage of requiring a separate HOE for SSD; the problem with this is that the optical pick-up becomes large in size because the HOE for SSD has a long optical path.

The present invention was completed in view of the foregoing. It provides an optical pick-up and an optical information recording and reproducing apparatus equipped therewith, which are suitable for any multilayer optical disc with three or more layers.

In order to address the above-mentioned problems, the present invention provides an optical pick-up which has an HOE for both adjustment and recording-reproducing, HOEs for assembling adjustment and recording-reproducing, or different HOEs for DPD method and push-pull method for TES detection. It has a function to switch from one HOE to another if it has multiple HOEs. The optical pick-up has a main photodetector (for RFS/TES detection) and a dummy photodetector (for assembling adjustment). The main photodetector is arranged at the position where the first diffracted light excluding the diffracted light of zero order that generates part of RFS reaches, for the first reflected light component that passes through the region to generate part of RFS in the HOE out of the reflected light from the optical disc. Also, the dummy photodetector is arranged at the position where the second diffracted light of the order differing from the order of the first diffracted light reaches. And, the optical information recording and reproducing apparatus performs feedback control on the relative position of the HOE and the photodetector by using the main detected signal and the dummy detected signal according to the amount of light detected by the main photodetector and the dummy photodetector.

The optical pick-up according to the present invention has a sub-photodetector to detect reflected stray light from the out-of-focus layers near the main photodetector for RF which mainly generates RFS. And, the optical information recording and reproducing apparatus according to the present invention multiplies the stray light signal detected by the sub-photodetector by a proper constant corresponding to the areal ratio and relative position of the main photodetector for RFS and the sub-photodetector, thereby calculating the stray light component which the main photodetector for RFS detects, and subtracts the signal detected by the main photodetector for RFS, thereby detecting the reproducing RFS for the target layer.

In other words, the optical information recording and reproducing apparatus according to one embodiment (shown in FIGS. 4 and 5) has the optical pick-up whose photodetector has the first (main) and second (dummy) photodetecting parts. The first photodetecting part detects the first diffracted light which is diffracted light generated by the diffracting optical element and which is diffracted light in the central region of reflected light. The second photodetecting part detects the second diffracted light which is diffracted light in the central region of reflected light and which differs from the first diffracted light in order. And, the photodetector outputs the first detected signal which responds to the amount of the second diffracted light detected and which generates signals for assembling adjustment and the second detected signal which responds to the amount of the first diffracted light detected and which generates signals for information recording and reproducing and for feedback control. On the other hand, the signal processing circuit generates, in response to the first detected signal, the control signal for position adjustment which is intended to adjust the relative position of the diffracting optical element and the photodetector, and also generates, in response to the second detected signal, the information recording and reproducing signal and the servo signal. And, the drive control part adjusts, in response to the control signal for position adjustment and the servo signal, the position of the diffracting optical element and the photodetector in the optical pick-up, and also executes, in response to the servo signal, the focus control and tracking control.

Moreover, the photodetector may optionally be provided with a third (sub) photodetecting part, which detects reflected stray light from the out-of-focus layers in an optical recording medium with multiple information recording layers. This third photodetecting part detects the third signal to calculate the stray light component. On the other hand, the signal processing circuit calculates the stray light component based on the third signal and subtracts the stray light component from the information recording and reproducing signal, thereby generating the information recording and reproducing signals resulting only from the target layer in the optical recording medium.

According to another embodiment (shown in FIGS. 9A and 9B), the optical pick-up may optionally be constructed such that the diffracting optical element has a first function (HOE for assembling adjustment and DPD) and a second function (HOE for PP) and be provided with an element to switch between the first and second functions of the diffracting optical element. When the first function is selected, the photodetector outputs the first detected signal which responds to the amount of the second diffracted light detected and which generates the signal for assembling adjustment. When the second function is selected, the photodetector outputs the second detected signal which responds to the amount of the first diffracted light detected and which generates the signal for information recording and reproducing and for feedback control. The signal processing circuit and the drive control part perform the same action as mentioned above.

According to another embodiment (shown in FIGS. 10A to 11B), the optical pick-up may optionally be constructed such that the diffracting optical element has a first function (HOE for assembling adjustment and DPD) and a second function (HOE for PP) and be provided with an element to switch between the first and second functions of the diffracting optical element, and the photodetector has the first (main) photodetecting part, which detects the first diffracted light (of plus first order) which is generated by the diffracting optical element and is in the central region of reflected light, and the second (dummy) photodetecting part, which detects the diffracted light (of zeroth order) in the central region of reflected light and which differs in order from the first diffracted light. When the first function is selected, the photodetector outputs the first detected signal which responds to the amount of the second diffracted light detected and which generates the signal for assembling adjustment, or outputs the second detected signal for information recording and reproducing signal which responds to the amount of the first diffracted light detected. When the second function is selected, the photodetector outputs the third detected signal which responds to the amount of the first diffracted light detected and which generates the signal for information recording and reproducing and for feedback control. On the other hand, the signal processing circuit generates the control signal for position adjustment (which is intended to adjust the relative position of the diffracting optical element and the photodetector based on the first detected signal) and the information recording and reproducing signal and the servo signal based on the second and third detected signals. The drive control part adjusts the position of the diffracting optical element and the photodetector in the optical pick-up based on the control signal for position adjustment and the servo signal, and executes the focus control and the tracking control based on the servo signal.

Another embodiment (shown in FIGS. 14A to 15B) is so designed as to divide and diffract the reflected light from the optical information recording medium (optical disc) into multiple light beams when the diffracting optical element acts for the first function (HOE for assembling adjustment and DPD), and also to diffract the reflected light in the central region of the reflected light in the direction different from that in other regions when the diffracting optical element acts as the second function (HOE for PP). In this case the photodetector has the first (dummy) photodetecting part, the second (main) photodetecting part, and the third (main) photodetecting part. The first one detects the diffracted the light of zeroth order (the first diffracted light) of the diffracting optical element which acts for the first function. The second one detects the diffracted light excluding that of zeroth order (the second diffracted light) which is the diffracted light in the central region of the reflected light of the diffracting optical element which acts for the second function. The third one detects the diffracted light excluding that of zeroth order (the third diffracted light) of the diffracting optical element which acts for the first function and the diffracted light excluding that of zeroth order (the fourth diffracted light) differing in angle of diffraction from the second diffracted light, which is the diffracted light of the diffracting optical element which acts for the second function. When the first function is selected, the photodetector outputs the first detected signal which responds to the amount of the first diffracted light detected and which generates the signal for assembling adjustment, or outputs the second detected signal for information recording and reproducing and feedback control in response to the amount of the third diffracted light detected. When the second function is selected, the photodetector outputs the third detected signal to generate signal for information recording and reproducing and for feedback control, the signal corresponding to the amount of the second and fourth diffracted light detected. On the other hand, the signal processing circuit generates the control signal for position adjustment to adjust the relative position of the diffracting optical element and the photodetector based on the first detected signal and also generates the information recording and reproducing signal based on the second or third detected signal. And, the drive control part adjusts the position of the diffracting optical element and the photodetector in the optical pick-up based on the control signal for position adjustment and the servo signal and executes the focus control and the tracking control based on the servo signal.

Another embodiment (shown in FIGS. 18A and 18B) employs the optical diffracting element of the same structure as shown FIGS. 14A and 14B; however, it does not have the dummy photodetecting part unlike the one shown in FIGS. 15A and 15B. In this case, the diffracting optical element divides and diffracts the reflected light into multiple light beams when it acts for the first function (HOE for assembling adjustment and DPD), and it also diffracts the light in the central region of reflected light in the direction different from that in other regions when it acts for the second function (HOE for PP). Also, the photodetector has the first (main) photodetecting part, the second (main) photodetecting part, the third (main) photodetecting part, and the fourth photodetecting part. The first one detects the diffracted light of zeroth order (the first diffracted light) of the diffracting optical element when it acts for the first function. The second one detects the diffracted light excluding that of zeroth order (the second diffracted light) which is the diffracted light in the central region of the reflected light of the diffracting optical element when it acts for the second function. The third one detects the diffracted light excluding that of zeroth order (the third diffracted light) of the diffracting optical element when its acts for the first function and the diffracted light excluding that of zeroth order (the fourth diffracted light) differing in angle of diffraction from the second diffracted light, which is the diffracted light of the diffracting optical element when it acts for the second function. The fourth one detects reflected stray light from the out-of-focus layers in the optical recording medium with multiple information recording layers and generates the signal to detect stray light component for calculation of stray light components. When the first function is selected, the photodetector outputs the first detected signal which responds to the amount of the first diffracted light detected and which generates the signal for assembling adjustment, or outputs the second detected signal for information recording and reproducing and feedback control in response to the amount of the first and third diffracted light detected. When the second function is selected, the photodetector outputs the third detected signal to generate a signal for information recording and reproducing and for feedback control, the signal corresponding to the amount of the second and fourth diffracted light detected. On the other hand, the signal processing circuit generates the control signal for position adjustment to adjust the relative position of the diffracting optical element and the photodetector based on the first detected signal and also generates the information recording and reproducing signal and servo signal based on the second or third detected signal. It also calculates the stray light component based on the signal to detect stray light component and subtracting the stray light component from the information recording and reproducing signal, thereby generating the information recording and reproducing signal arising only from the target layer in the optical recording medium. And, the drive control part adjusts the position of the diffracting optical element and the photodetector in the optical pick-up based on the control signal for position adjustment and executes the focus control and the tracking control based on the servo signal.

Additional features of the present invention will become apparent from the best mode for carrying out the invention (mentioned later) and the accompanying drawings.

The present invention provides an optical pick-up and an optical information recording and reproducing apparatus provided therewith. When used for information recording and reproducing on and from a multilayer disc, the optical pick-up permits accurate positioning of the HOE and the photodetector at the time of initial assembling adjustment and gives stable reproducing RF signals and servo signals. The optical pick-up and the optical information recording and reproducing apparatus give RFS, FES, and TES under a minimum influence of reflected stray light from the out-of-focus layers.

BRIEF DESCRIPTION OF THE DRAWINGS

FIG. 4 is a diagram illustrating the structure of the diffracting optical element according to the first embodiment;

FIGS. 6A and 6B are diagrams illustrating the position where the reflected light from the target layer out of focus impinges on the photodetector, according to the first embodiment;

FIGS. 9A and 9B are diagrams illustrating the structure of the diffracting optical element, the structure of the photodetector, and the light focusing positions for assembling adjustment according to the first embodiment;

FIGS. 10A and 10B are diagrams illustrating the structure of the diffracting optical element according to the second embodiment;

FIGS. 11A and 11B are diagrams illustrating the structure of the photodetector and the light focusing position of the reflected light according to the second embodiment;

FIGS. 12A and 12B are diagrams illustrating the position where the reflected light from the target layer out of focus impinges on the photodetector, according to the second embodiment;

FIGS. 13A and 13B are diagrams illustrating the position where the reflected stray light from the out-of-focus layers impinges on the photodetector, according to the second embodiment;

FIGS. 15A and 15B are diagrams illustrating the structure of the photodetector and the light focusing position of the reflected light according to the third embodiment;

FIGS. 16A and 16B are diagrams illustrating the position where the reflected light from the target layer out of focus impinges on the photodetector, according to the third embodiment;

FIGS. 18A and 18B are diagrams illustrating the structure of the photodetector and the light focusing position of the reflected light according to the fourth embodiment.

DETAILED DESCRIPTION OF THE PREFERRED EMBODIMENTS

Figure 1:
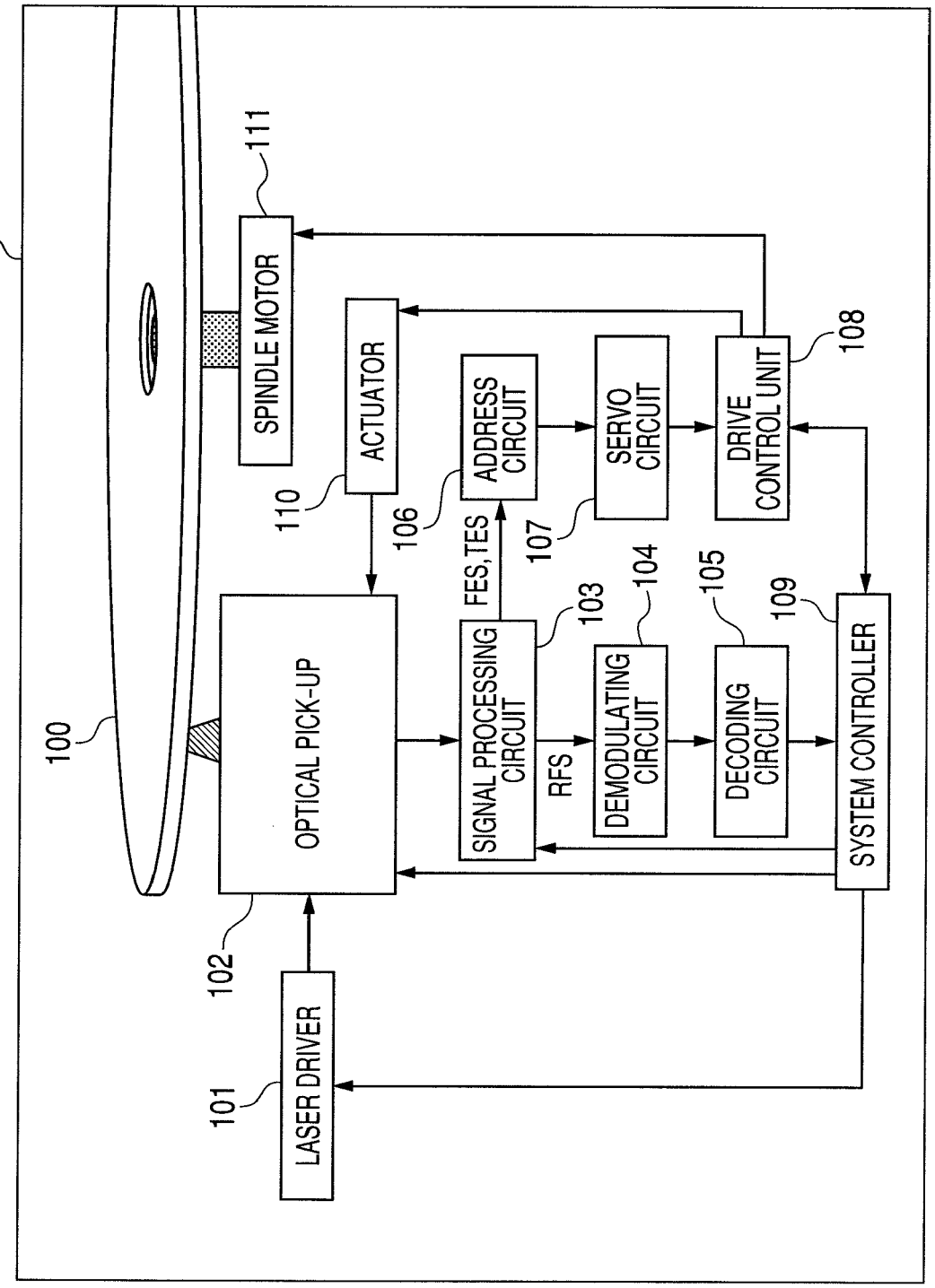
FIG. 1 is a block diagram schematically illustrating the entire structure of the optical information and recording apparatus according to the present invention.

The embodiments of the present invention will be described below in more detail with reference to the accompanying drawings. They merely represent some typical examples to realize the present invention and should not be construed to restrict the scope of the present invention. The accompanying drawings employ the same reference numerals for the common structure.

(1) First Embodiment

The optical disc 100 gives the reflected light L300, which has near the center thereof its optical axis along which it propagates. The center of the reflected light L300 is the region where the intensity of light is strongest, and it is mainly used to generate reproducing RF signals. The first embodiment is designed to detect two kinds of light having almost the same intensity. The first one is diffracted light of plus first order, which is detected as reproducing RF signal component in the neighborhood of the center of the reflected light L300. The second one is diffracted light of any order (say, minus first order) other than zeroth order which arises from the same region. The thus detected signals are used for feedback control for adjustment of the relative position of the integrated optical element 206 and the photodetector 207 (See FIG. 3.). The advantage of the first embodiment is an ability to minimize the influence of the reflected stray light, which is contained in the reflected light L300 and is attributable to the out-of-focus layers, because no use is made of the diffracted light of zeroth order.

<Construction of the Optical Information Recording and Reproducing Apparatus>

FIG. 1 is a diagram schematically illustrating the construction of the optical information and recording apparatus according to the present invention. The optical information recording and reproducing apparatus 1 is intended to record and read information on and from the optical disc 100. It is comprised of the laser driver 101, the optical pick-up 102 which emanates a laser beam and detects the reflected light from the optical disc 100, multiple signal processing parts 103 to 108, the actuator 110 which moves the optical pick-up to a specific track of the optical disc 100 for recording and reproducing, the spindle motor 111 which rotates the optical disc 100, and the system controller 109 which entirely controls the optical information recording and reproducing apparatus 1.

The optical pick-up 102 has the semiconductor laser 201, which is controlled by the laser driver 101. The light beam emanating from the semiconductor laser 201 is directed to the optical disc 100 having multiple information recording layers through the objective lens 105 contained in the optical pick-up 102. And, the reflected light from the optical disc is detected by the photodetector 207 contained in the optical pick-up 102.

The signal processing circuit 103 generates reproducing RF signals (RFS), focus error signals (FES), and tracking error signals (TES) based on the detected signals. The RFS is sent to the system controller 109 through the demodulating circuit 104 and the decoding circuit 105. The FES and TES are sent to the derive control unit 108 through the address circuit 106 and the servo circuit 107. The drive control unit 108 controls the spindle motor 111 based on instructions from the system controller 109 so as to rotate the optical disc 100 at a prescribed speed.

The actuator 110 receives servo signals and address signals from the drive control unit 108 so as to control the optical pick-up 102 based on them.

The optical pick-up 102 and the signal processing circuit 103 execute necessary control and signal processing based on instructions from the system controller 109 according to the detected signals etc. which vary depending on the type of the optical disc (such as BD-R/RE and BD-ROM) being used.

<Structure of the Optical Pick-Up>

Figure 2:
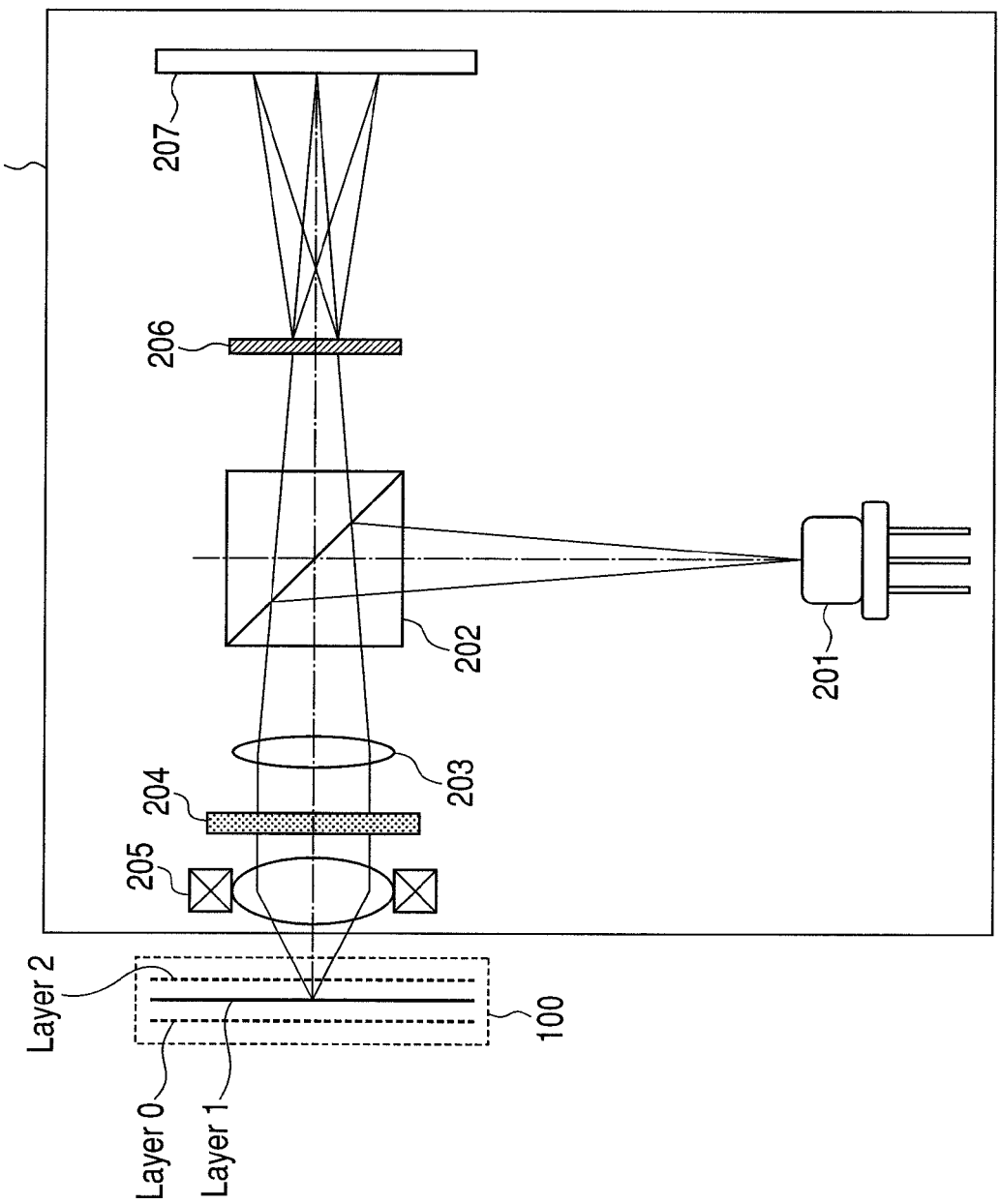
FIG. 2 is a schematic diagram illustrating the structure of the optical pick-up according to the present invention.

FIG. 2 is a schematic diagram illustrating the structure of the optical pick-up according to the present invention. It is assumed that recording or reproducing is being performed on the second layer (Layer 1) of the three-layered optical disc, as viewed from the incident side.

The beam of S-polarized light radiating from the semiconductor laser 201 is reflected by the polarization beam splitter (PBS) 202 at a right angle toward the optical disc 100, and the reflected beam is collimated by the collimator lens 203. The collimated incident beam is subsequently converted into circularly polarized light from linearly polarized light by the quarter-wave plate 204. The circularly polarized light is focused by the objective lens 205 and directed to the optical disc 100.

The reflected light from the optical disc 100 is collimated again by the objective lens 205 and the circularly polarized light is converted into linearly P-polarized light by the quarter-wave plate 204. The P-polarized light is converted into the convergent light by the collimator lens 203. Also, the reflected light (which is P-polarized light) passes through the PBS 202 and then is divided and diffracted by the integrated optical element 206. Thus, the divided and diffracted light impinge on the photodetector 207.

<Integrated Optical Element>

Figure 3A:
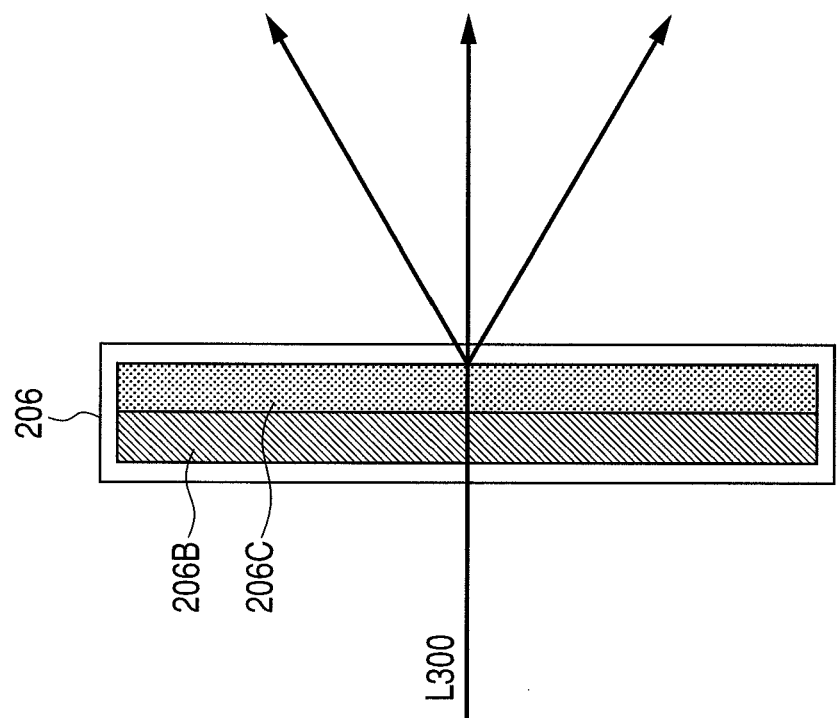
FIG. 3 is a diagram illustrating the structure of the integrated optical element used in the present invention.
Figure 3B:
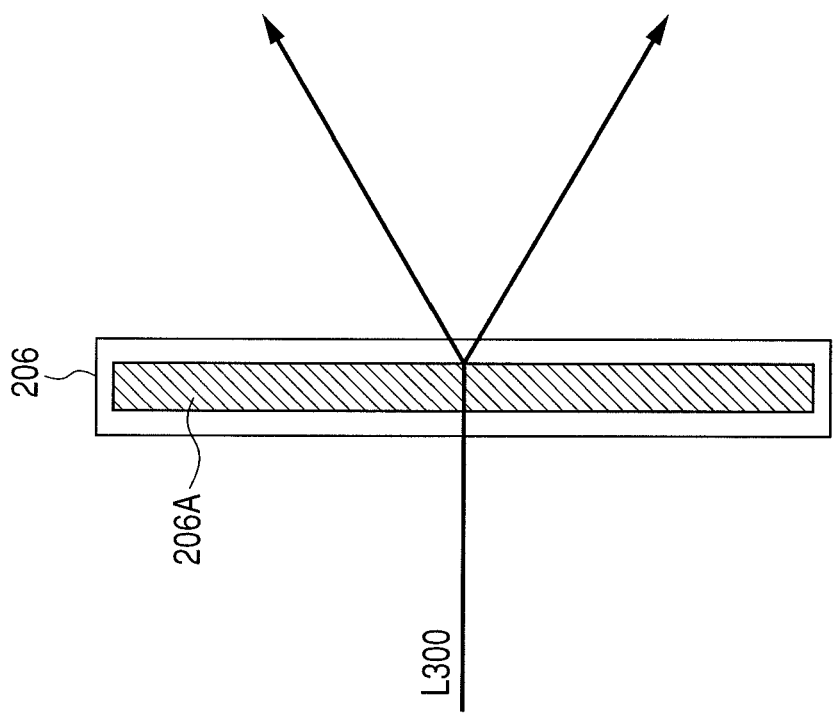

FIGS. 3A and 3B are diagrams illustrating the structure of the integrated optical element 206 used in the first embodiment of the present invention. The integrated optical element 206 has the function as a diffraction grating. The reflected light L300 is divided by the integrated optical element 206, and the divided light beams are detected to generate RFS, FES, and TES. Thus, the integrated optical element 206 has multiple regions for diffraction in different directions. It should preferably be one such as holographic optical element (HOE).

FIG. 3A shows one example of the integrated optical element 206 whose constituent is one diffracting optical element 206A composed of diffraction gratings differing from one region to another. The diffracting optical element 206A diffracts the reflected light L300 from the optical disc 100. In this case, the same HOE is used both for assembling adjustment and for recording/reproducing.

Alternatively, the integrated optical element 206 may also be composed of two or more diffracting optical elements differing in mode of diffraction as shown in FIG. 3B. The one shown in FIG. 3B uses more than one mode of diffraction.

These elements are switched from one to another in the case where different detectors are used for assembling adjustment and recording/reproducing or in the case where arithmetic processing for servo signals is performed differently depending on the type of the optical disc 100 (such as BD-R/RE or BD-ROM) being used for recording and reproducing. Operation in this manner changes the direction of diffraction of the reflected light L300 and simplifies the arithmetic operation and diversifies the function of the detected signals. Changing the direction of diffraction may be accomplished by selecting a diffracting optical element which works or does not work depending on the state of light, such as wavelength, polarization, and divergence or by utilizing the property that diffraction varies depending on the state of light.

Thus, as shown in FIG. 3B, the integrated optical element 206 is composed of the element 206B, which changes the state of light, and the composite diffracting optical element 206C, which performs diffraction in more than one mode. For example, it may be composed of a half-wave plate as the element 206B and a polarizing HOE as the element 206C, if it is desirable to use the polarizing characteristics. In this case the mode of diffraction to be used is selected according to the direction of polarization of L300. The state of polarization of the reflected light L300 is changed by rotating the crystal axis of the variable half-wave plate 206B. The variable half-wave plate 206B may be formed from such material as liquid crystal or birefringent crystal which exhibits birefringence.

The following description is based on the assumption that the element 206B, which changes the state of light, is a variable half-wave plate and the composite diffracting optical element 206C is a polarizing HOE. Although not shown, the integrated optical element 206 may also be composed of multiple diffracting optical elements placed one over another, which are mechanically switched from one to another having the desired mode of diffraction, instead of using the change in properties of light to select a diffracting optical element from two or more elements. Alternatively, the diffracting optical element may be formed from a material which varies in mode of diffraction depending on the input signal. In this case, the integrated optical element 206 is constructed of one optical element 206A.

<Shape of the Integrated Optical Element>

FIG. 4 is a diagram illustrating the shape of the integrated optical element used in the first embodiment. It shows the shape of the HOE corresponding to 206A shown in FIG. 3A. According to the first embodiment, the HOE 206A is divided into more than one region, each producing no diffracted zeroth ordered light. The solid lines in the figure indicate the boundaries of the regions. The vertical and horizontal directions of the HOE optically coincide respectively with the tracking direction (Tan direction) and the radial direction (Rad direction) of the optical disc 100. Here, the Rad and Tan directions are defined as the directions of diffraction of positive order and the −Rad and −Tan directions are defined as the directions of diffraction of negative order. Moreover, the dotted line in the diagram indicates the reflected light L300, and the stripy pattern at the right and left sides of the reflected light L300 indicate the push-pull pattern attributable to the tracks of the optical disc 100.

The push-pull pattern is an interference pattern in the reflected light L300 which occurs as the groove on the optical disc 100 functions as a diffraction grating. Since the push-pull pattern changes according as the relative position of the objective lens 205 and the groove fluctuates, it represents the AC component of TES. In addition, other regions than the interference pattern in the reflected light L300 give the DC component of TES because they are not affected by the relative position of the objective lens 205 and the groove. Incidentally, both the AC and DC components of TES are affected by the shifting of the objective lens 205.

In FIG. 4, the regions 10a to 10d are positioned at the right and left sides (excluding the vicinity of the center) of the HOE 206A. They diffract the light passing through them in the Tan direction, thereby giving diffracted light of plus/minus first order. They are arranged such that diffracted light beams from them range in the Tan direction.

The regions 10a and 10b and the regions 10c and 10d are arranged such that all the push-pull patterns in the reflected light L300 pass through them even in the case where the objective lens 205 shifts in the Rad direction. The boundary between the regions 10a and 10b and the boundary between the regions 10c and 10d are established such that the reflected light L300 is approximately halved when the center of the reflected light L300 coincides with the center of the HOE 206A. Incidentally, the diffracted light of plus first order in the regions 10a to 10d is used for detection of FES by the knife-edge method, and the diffracted light of minus first order is used for detection of AC component of TES by the push-pull method.

The regions 10e to 10h are arranged in the regions excluding the regions 10a to 10d and the vicinity of the center of the HOE 206A. Each of these regions diffracts the light passing through it, thereby giving the diffracted light of plus/minus first order in the Tan direction. The diffracted light beams from these regions range in the Rad direction. The boundary between the regions 10h and 10e and the boundary between the regions 10f and 10g are established such that the reflected light L300 is approximately halved when the center of the reflected light L300 coincides with the center of the HOE 206A.

The diffracted light of plus/minus first order resulting from the regions 10e to 10h is used as the DC component for detection of TES by the push-pull method.

The region 10i is positioned in the central area including the center of the HOE 206A. It diffracts the light beam in the Rad direction so that the reflected stray light from the out-of-focus layers in other regions does not enter the photodetector. The diffracted light of plus/minus first order in the region 10i is divided in a certain ratio to ensure an adequate amount of light for RFS if the diffracted light of plus first order is used for RFS and the diffracted light of minus first order is used to control the position of the integrated optical element 206 and the photodetectors 207. For example, the ratio would be 95:5 in terms of the intensity of diffracted light of plus first order to the intensity of diffracted light of minus first order.

The angle of diffraction from each region in all the regions excluding the region 10i is established such that the reflected light from the target layer is focused approximately at the center of each light receiving part of the photodetector 207. On the other hand, individual light receiving parts of the photodetector 207 are arranged such that they do not receive the reflected stray light from the out-of-focus layer. Also, the angle of diffraction of the diffracted light from all the regions excluding the region 10i is established such that the reflected stray light from the out-of-focus layer which impinges on the photodetector 207 out of focus spreads in the direction where there exist no light receiving parts.

Incidentally, the diffracted light of plus first order and the diffracted light of minus first order may be mutually exchanged, and their ratio may be properly changed.

<Structure of the Light Receiving Parts of the Photodetector and the Generation of Signals>

Figure 5:
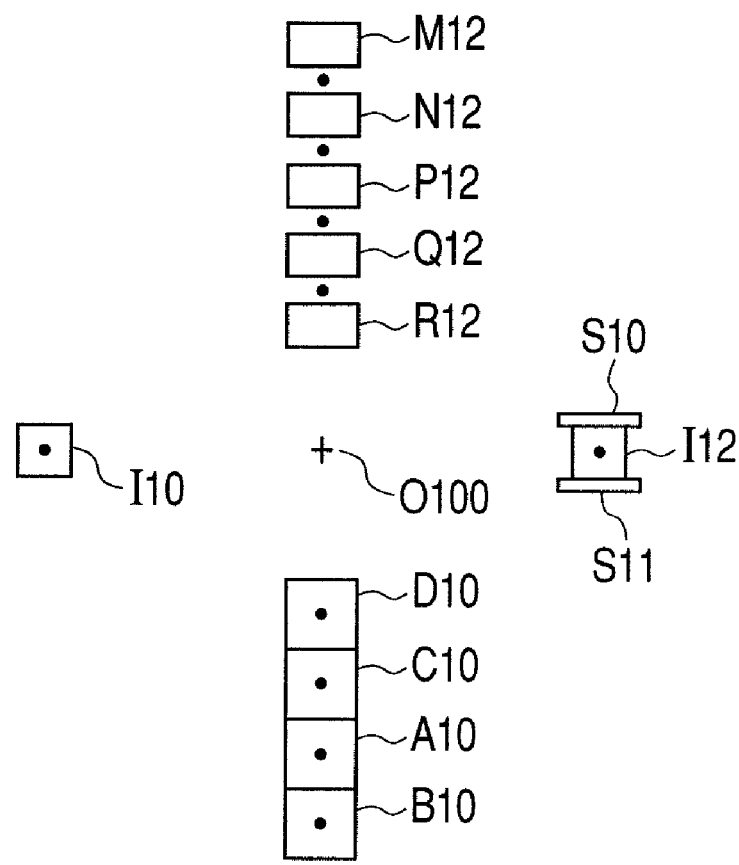
FIG. 5 is a diagram illustrating the structure of the photodetector and the position where the reflected light is focused according to the first embodiment.

FIG. 5 is a diagram illustrating the arrangement of the light receiving parts of the photodetector 207, the arrangement corresponding to the integrated optical element 206A (shown in FIGS. 3A and 4) according to the first embodiment. FIG. 5 also shows the positions where that portion of reflected light L300 which is the reflected light from the target layer is focused at the time of recording and reproducing. However, FIG. 5 does not show the reflected stray light from the out-of-focus layers.

The photodetector 207 is composed of multiple light receiving parts. The light receiving parts of the main photodetector are arranged at the position where the reflected light from the target layer is focused after division and diffraction by the integrated optical element 206. The light receiving parts of the dummy photodetector are arranged at the position where the light beam for assembling adjustment is focused. The sub-detector for stray light is arranged at the position which is illuminated by the reflected light from the out-of-focus layers, the reflected light including the center of the optical axis of the reflected light L300.

In FIG. 5, the reference numerals A10 to H10, E12 to I12, M12, N12, P12, Q12, and R12 represent the light receiving parts of the main photodetector; the reference numeral I10 represents the light receiving part of the dummy photodetector; and the reference numerals S10 and S11 represent the light receiving parts of the sub-detector for stray light.

TES is generated based on the signals detected by the light receiving parts A10 to H10 and E12 to H12. FES is generated based on the signals detected by the light receiving parts M12, N12, P12, Q12, and R12. Incidentally, all the light receiving parts of the photodetector are of the size corresponding to the shift plus/minus hundreds of μm of the objective lens 205.

When the optical axes of the reflected light L300, the optical axis of the integrated optical element 206, and the optical axis (indicated by O100) of the photodetector 207 coincide with one another, the diffracted light of minus first order from the regions 10a to 10d focuses at the center of the light receiving parts A10 to D10, and the diffracted light of plus first order focuses at the intermediate point between N12 and P12, between M12 and N12, between P12 and Q12, and between Q12 and R12. The focused light is detected in the defocused state.

Likewise, the diffracted light of plus first order from the regions 10e to 10h focuses at the center of the light receiving parts E12 to H12, and the diffracted light of minus first order focuses at the center of the light receiving parts E10 to H10, so that they are detected there.

The light receiving parts I12 and I10 are arranged in the Rad direction away from the position O100. The diffracted light of plus first order and the diffracted light of minus first order, which arise from the light beam passing through the region 10i, condense at them, so that they are detected there.

The light receiving part I10 of the dummy photodetector is used only at the time of assembling adjustment, and the signals detected by the light receiving parts I12 and I10 are used for feedback control for assembling adjustment.

The signals detected by the light receiving parts I12 and I10 are used to generate error signals for feedback control, so that the axis of the integrated optical element 206 is aligned with the axis of the photodetector 207 and their relative position is adjusted.

The light receiving part I10 of the dummy photodetector has a smaller light receiving area than that of the main photodetector I12, so that a high precision is ensured for position adjustment.

<Generation of Focus Error Signal>

FIG. 6A is a diagram illustrating the reflected light from Layer 1 (target layer engaged in recording and reproducing) which occurs when the focus point of the objective lens 205 shifts toward Layer 0 (which is beyond Layer 1 as viewed from the incident side). FIG. 6B is a diagram illustrating the reflected light from Layer 1 which occurs when the focus point of the objective lens 205 shifts toward Layer 2 which is close to the incident side.

The spots of the diffracted light from the regions 10a to 10d get blurred as they move in the Rad direction in response to defocusing. The spots of the diffracted light from the regions 10e to 10h get blurred as they move in the Tan direction in response to defocusing. The spot of the diffracted light from the region 10i gets blurred while staying at the same position in response to defocusing.

When the objective lens just comes into focus on the target layer, all the signals detected by the photodetectors M12 to R12 for FES become null, and hence FES becomes zero.

Also, when the objective lens gets out of focus toward Layer 0, the light receiving parts N12 and Q12 detect signals in proportion to the amount of light received. When the objective lens gets out of focus toward Layer 2, the light receiving parts M12, P12, and R12 detect signals in proportion to the amount of light received. Thus, FES1 is obtained from the signals detected by the light receiving parts M12, N12, P12, Q12, and R12 according to the formula (1-1) below.

$$FES1 = M12 + P12 + R12 - (N12 + Q12) \quad (1\text{-}1)$$

The light receiving parts E12 to H12 and E10 to H10 are arranged in the Rad direction away from the group of A10, B10, C10, and D10 and the group of M12, N12, P12, Q12, and R12 in the Tan direction, as viewed from the position O100.

<Generation of Tracking Error Signal for DPD Method>

The signals detected by the light receiving parts A10 to H10 are used to obtain TES for DPD method and DPD1 according to the formula (1-2) below.

$$DPD1 = (A10 + E10 + C10 + G10) - (B10 + F10 + D10 + H10) \quad (1\text{-}2)$$

<Generation of Tracking Error Signal for Push-Pull Method>

The signals detected by the light receiving parts E12 to H12 and E10 to H10 and A10 to D10 are used to obtain TES for push-pull method and PPS1 according to the formula (1-3) below.

$$PPS1 = (A10 + B10 + E10 + F10) - (C10 + D10 + G10 + H10) - kt1 \times \{(E12 + F12) - (G12 + H12)\} \quad (1\text{-}3)$$

Here, "kt1" in the above formula is a constant which has been established so that offset does not occur in PPS1 when the objective lens 205 moves in the Rad direction as the result of tracking action.

Figure 7C:
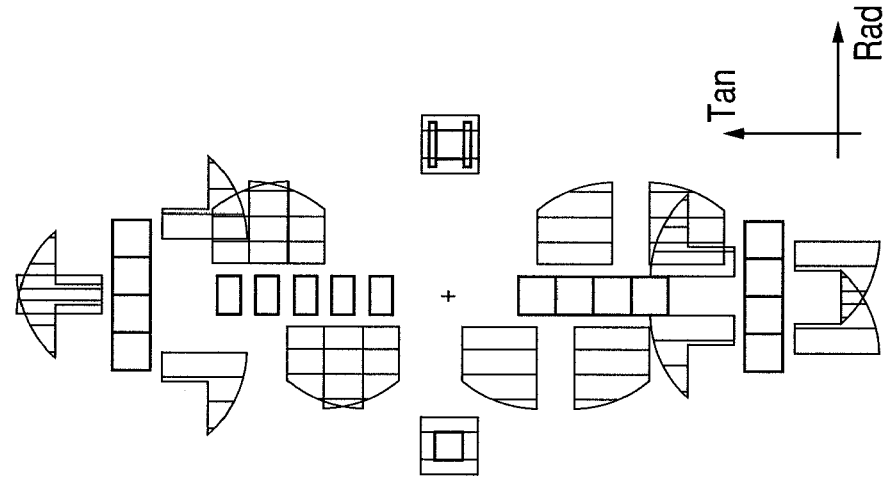
FIGS. 7A to 7C are diagrams illustrating the position where the reflected stray light from the out-of-focus layer (Layer 0) impinges on the photodetector, according to the first embodiment.
Figure 7A:
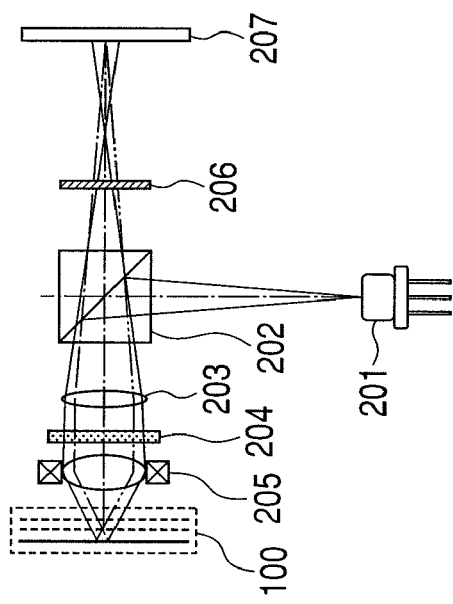
Figure 7B:
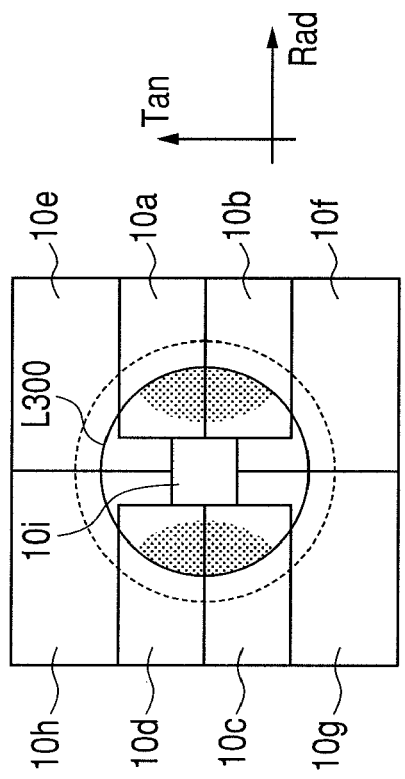
Figure 8A:
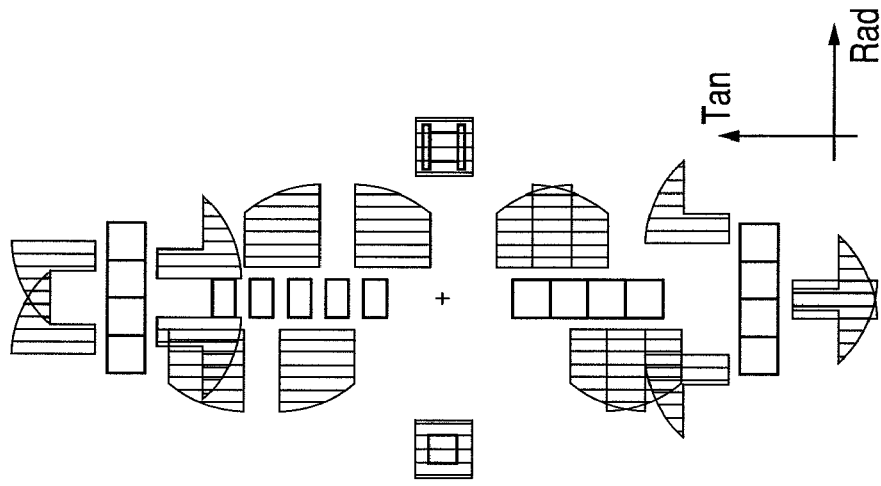
FIGS. 8A to 8C are diagrams illustrating the position where the reflected stray light from the out-of-focus layer (Layer 2) impinges on the photodetector, according to the first embodiment.
Figure 8B:
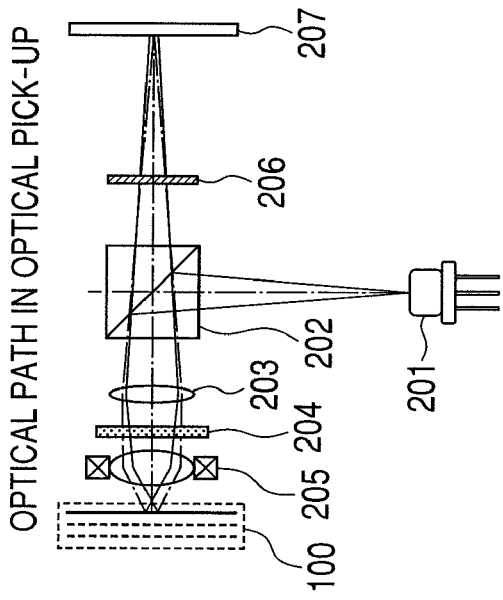
Figure 8C:
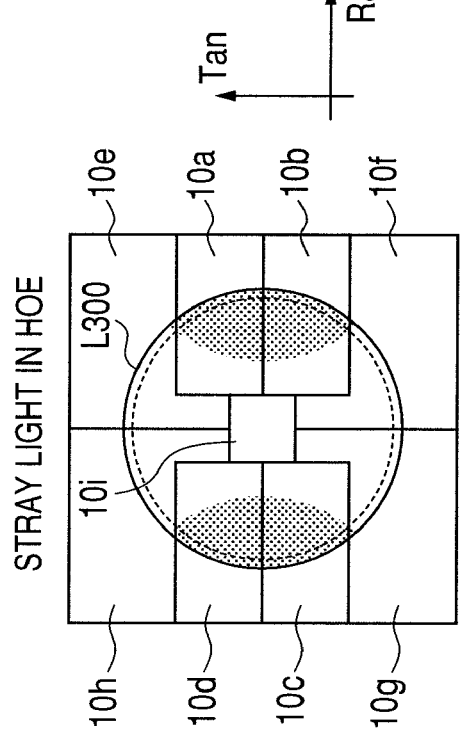

FIGS. 7A to 8C are diagrams illustrating respectively the reflected stray light from Layer 0 and the reflected stray light from Layer 2 in the case where the optical disc 100 has three information recording layers and Layer 1 is the target layer engaged in recording and reproducing. FIGS. 7A and 8A show parts in the optical pick-up 102. FIGS. 7B and 8B show the arrangement of regions in the HOE 206A. FIGS. 7C and 8C show the light receiving parts in the photodetector 207.

The dotted line in FIGS. 7B and 8B indicates the beam size (on the HOE 206A) of the reflected light from the target layer.

As shown in FIGS. 7A and 8A, the reflected stray light from Layer 0 and Layer 2 (which are out-of-focus) focuses at a position away from the photodetector 207 in either direction of its propagation, and hence it is out of focus on the photodetector 207.

The diffracted light from the regions 10a to 10d moves in the Rad direction when the reflected stray light is out of focus, while the light receiving parts A10 to D10 and the light receiving parts for FES are arranged in the Tan direction. Likewise, the diffracted light from the regions 10e to 10h moves in the Tan direction when the reflected stray light is out of focus, while the light receiving parts E12 to H12 and E10 to H10 are arranged in the Rad direction. Consequently, the reflected stray light from the out-of-focus layers does not enter the light receiving parts of the main photodetector so long as they have a minimum size just enough to adapt to the shifting of the objective lens 205.

According to this embodiment, therefore, the reflected stray light from the out-of-focus layers is hardly detected by the light receiving parts for servo control and this leads to the generation of stable servo signals.

<Generation of Reproducing RF Signals>

The light receiving part I12 undesirably receives the reflected stray light (out of focus) from the out-of-focus layers, unlike the detector for servo signals. To cope with this, the light receiving part I12 is flanked with the light receiving parts S10 and S11 of the stray light detector, which detect as much stray light as the light detecting part I12 does.

In order that the reflected stray light is adequately detected even when the objective lens shifts, the stray light receiving parts S10 and S11 are arranged at right angles to the direction of tracking motion of the objective lens 205 and they have an adequate size in the direction of tracking motion. Although not shown in FIGS. 7A to 8C, the foregoing may be modified such that a plurality of stray light receiving parts surround the light receiving part I12 or only one stray light receiving part is placed in the direction perpendicular to the direction of tracking motion.

The reproducing RF signal (FRS1) is obtained from signals detected by the light receiving parts A10 to H10, I12, S10, and S11 according to the formula (1-4) below.

$$RFS1 = A10 + B10 + C10 + D10 + E10 + F10 + G10 + H10 + I12 - ks1 \times (S10 + S11) \quad (1\text{-}4)$$

Here, "ks1" is a constant which depends on the areal ratio and the relative position of the light receiving parts I12, S10, and S11. As noted from the formula (1-4), it is possible to extract the reproducing RF signal of the target layer by roughly calculating the reflected stray light component detected by the light receiving part I12 and subtracting the result from the actually detected signals.

<HOE for Assembling Adjustment>

The following describes how the HOE is used for assembling adjustment. FIGS. 9A and 9B show the photodetector which is identical with that used in the first embodiment mentioned above except that the HOE performs diffraction in different mode depending on whether it is used for assembling adjustment or recording and reproducing.

The integrated optical element 206 used in this case is one which has the structure shown in FIG. 3B. The HOE for assembling adjustment which has the shape shown in FIG. 9A is used as 206C shown in FIG. 3B. Also, FIG. 9B shows the light focusing position on the detector 207.

The regions 11a to 11d yield the diffracted light of plus first order which is detected as focus error signal for the double knife edge method. Also, the region 11i yields diffracted light in multiple modes which is detected as signals for assembling adjustment.

In order to suppress the reflected stray light from the out-of-focus layers (which interferes with detection of servo signals at the time of assembling adjustment), a single-layer optical disc may be employed. Thus there is no possibility of the reflected stray light illuminating the light receiving part, and the diffracted light from the region 11i is allowed to include that of zeroth order.

If the no diffracted zeroth ordered light is to be detected, the dummy photodetector I11 should be provided, which is indicated by a dotted line in the vicinity of the center as shown in FIG. 9B. At the time of recording and reproducing, the mode of diffraction as shown in FIG. 4 may be realized by switching with the variable half-wave plate 206B. In this case, unlike the foregoing, the region 11i (which corresponds to 10i in FIG. 4) only yields the diffracted light for reproducing RF signals but does not yield the diffracted light (for assembling adjustment) to be received by the dummy photodetector.

The HOE for assembling adjustment may have a different shape as follows. The HOE in this case is similar to that shown in FIG. 4 but is different in the ratio of the diffracted light of plus first order (for RFS component and assembling adjustment) to be received by the main photodetector to the diffracted light (for assembling adjustment) to be received by the dummy photodetector. (This statement is applicable only to the reflected light passing through the region 11i, which corresponds to 10i in FIG. 4.) An example of the ratio may be 50:50 at the time of assembling adjustment or 100:0 at the time of recording and reproducing. In this case, the HOE may be entirely a polarizing HOE or one which is capable of polarization only in the region 11i, which corresponds to 10i in FIG. 4.

(2) Second Embodiment

The second embodiment employs the mode of diffraction that varies depending on the occasion for assembling adjustment or recording/reproducing. In other words, it employs the no diffracted zeroth ordered light in addition to the diffracted light of minus first order for assembling adjustment of the integrated optical element 206 and the photodetector 207. The no diffracted zeroth ordered light has little effect on the fabricating accuracy of HOE and permits accurate assembling.

In the case of tracking control by DPD method, the diffracted light containing the center of the optical axis of the reflected light L300 inevitably includes the reflected stray light from the out-of-focus layers. This problem is addressed by using both the HOE for assembling adjustment and the HOE for tracking control by DPD method. However, tracking control by push-pull method is accomplished by using HOEs differing in mode of diffraction. In this way it is possible to realize an optical pick-up capable of accurate assembling adjustment and less vulnerable to reflected stray light.

Moreover, it will be possible to simplify the structure of the photodetector 207 and the computation of signals if arrangement is made such that a single light receiving part receives diffracted light from multiple different regions in the HOE.

FIGS. 10A to 13B show the HOE and the photodetector involved in the second embodiment. Those which correspond to the ones involved in the first embodiment (shown in FIGS. 1 to 9B) are given the same reference numerals. Incidentally, the optical information recording and reproducing apparatus 1 and the optical pick-up 102 are the same in structure throughout the first and second embodiments, and hence their description is omitted in the following.

<Structure of the Diffraction Grating>

FIGS. 10A and 10B are diagrams illustrating the structure of the polarizing HOE according to the second embodiment of the present invention. FIG. 10A is a diagram illustrating the structure of the HOE (for assembling adjustment and DPD) to be used for assembling adjustment and for tracking control by DPD method (at the time of recording and reproducing) which is necessary for reproducing from BD-ROM. FIG. 10B is a diagram illustrating the structure of the HOE (for PP) to be used for tracking control by push-pull method (at the time of recording and reproducing), which is necessary for recording and reproducing on and from BD-R/RE.

In FIG. 10A, the regions 20a to 20d are formed by dividing the HOE in such a way that all the interference pattern due to ROM pits in the reflected light L300 pass through. To be more specific, the boundaries between the regions 20a and 20b, 20c and 20d, 20e and 20h, and 20f and 20g are established such that the reflected light L300 is nearly halved when the center of the reflected light L300 coincides with the center of the HOE.

The light passing through the regions 20a to 20d shown in FIG. 10A becomes diffracted light of plus first order or minus first order in the Tan direction. All of the diffracted light from these regions range in the Tan direction. The diffracted light from the regions 20a and 20c and the diffracted light from the regions 20b and 20d condense at the same position, and they are detected altogether as reproducing RFS and as TES for DPD method. Incidentally, although not shown, the HOE may be constructed such that there exists the central position O200 between the focusing position for the regions 20a and 20c and the focusing position for the regions 20b and 20d.

The light passing through the regions 20e to 20h becomes the diffracted light of plus first order in the Tan direction. All of the diffracted light from these regions range in the Rad direction. The diffracted light of plus first order from the regions 20e and 20h is detected as FES.

The light passing through the region 20i becomes the no diffracted zeroth ordered light and the diffracted light of plus first order in the Rad direction. The former is detected as the signal for assembling adjustment, and the latter is detected as the signals for assembling adjustment and as the reproducing RFS. In the case where the diffracted light of plus first order from the region 20i is used for reproducing RFS, it is possible to use any diffracted light (other than that of plus first order) for assembling adjustment. Therefore, it is possible to use the diffracted light of minus first order although the no diffracted zeroth ordered light is used in this embodiment.

The structure shown in FIG. 10B is identical with that in the first embodiment. Therefore, its detailed description is omitted.

As mentioned above, the HOE shown in FIG. 10A is used for assembling adjustment and DPD. By contrast, the HOE shown in FIG. 10B is used for PP but not for assembling adjustment. The HOE shown in FIG. 10B and the HOE shown in FIG. 10A are used for recording media of different type. Further, the HOE of any of these structures is to be used as 206C in FIG. 3B. Which one to use is switched by the element 206B according to the recording media involved.

<Structure of the Photodetector>

FIG. 11 is a diagram illustrating the structure of the photodetector according to the second embodiment. The main photodetector has the light receiving parts A20, D20, E20, G20, H20, I22, M22, N22, P22, and Q22. The dummy photodetector has the light receiving part I21. The sub-photodetector for stray light has the light receiving parts S20 and S21.

The signals detected by the light receiving parts A20, D20, E20, G20, and H20 generate TES, and the signals detected by the light receiving parts M22, N22, P22, and Q22 generate FES. Incidentally, the light receiving parts of the main photodetector should have a minimum size just enough to adapt to the shifting plus/minus hundreds of μm of the objective lens 205, as in the first embodiment.

When the optical axis of the reflected light L300, the center of the integrated optical element 206, and the center O200 of the photodetector 207 coincide with one another, the diffracted light of minus first order from the regions 20a, 20c, 21a, and 21b focuses at the center of the light receiving part A20, the diffracted light of minus first order from the regions 20b, 20d, 21c, and 21d focuses at the center of the light receiving part D20, the diffracted light of minus first order from the regions 21e and 21f focuses at the central line extending in the tracking direction of the light receiving part E20, the diffracted light of minus first order from the region 21g focuses at the center of the light receiving part G20, and the diffracted light of minus first order from the region 21h focuses at the center of the light receiving part H20. And the thus focusing light is detected.

Incidentally, the light receiving part E20 receives all the diffracted light from multiple different regions in the HOE. This simplifies the structure of the photodetector 207 and the computation of signals. On the other hand, in order for the light receiving part E20 to have the same response characteristics as the light receiving parts G20 and H20, the light receiving parts (E20) and (F20), indicated by dotted lines in FIGS. 11A and 11B, are provided, which have the same size as the light receiving parts G20 and H20. (E20) and (F20) are placed respectively at the positive position and at the negative position in the Rad direction on the same axis of the light receiving parts G20 and H20. The light receiving parts (E20) and (F20) receive respectively the diffracted light of minus first order from the regions 20e and 21e and the diffracted light of minus first order from the regions 20f and 21f in the HOE.

Each of the diffracted light of plus first order from the regions 20e, 21e, 20h, and 21h range in the Rad direction between the light receiving parts P22 and Q22. The diffracted light from the regions 20e and 21e focuses inside and the diffracted light from the regions 20h and 21h focuses outside, as viewed from the center O200.

Each of the diffracted light of plus first order from the regions 20f, 21f, 20g, and 21g range in the Rad direction between the light receiving parts M22 and N22. The diffracted light from the regions 20f and 21f focuses inside and the diffracted light from the regions 20g and 21g focuses outside, as viewed from the center O200. The diffracted light of plus first order from the regions 20e to 20h and 21e to 21h is detected by the light receiving parts M22, N22, P22, and Q22 when the objective lens is out of focus.

The light receiving parts M22, N22, P22, and Q22 (for detection of FES) are arranged at positions away more than the distance between the center position O200 and the focusing positions for the regions 20a to 20d and 21a to 21d. This arrangement prevents the light receiving parts from being exposed to the reflected stray light from the out-of-focus layers, which leads to detection of stable FES.

The diffracted light of plus first order from the regions 20i and 21i focuses at the center of the light receiving part I22, and the no diffracted zeroth ordered light from the region 20i focuses at the center of the light receiving part I21. The thus focused light is detected.

In the case where the diffracted light of minus first order is used for assembling adjustment, the light receiving part I20 is provided, in place of the light receiving part I21, at the position where the diffracted light of minus first order focuses (The light receiving part I20 corresponds to the light receiving part I10 in the first embodiment.).

The dummy-photodetector (light receiving part) I21 is used only for assembling adjustment. The light receiving part I22 and the signal detected by the dummy photodetector I21 are used for feedback control for assembling adjustment.

The signals detected by the light receiving parts I22 and I21 generate error signals for feedback control, so that the center of the integrated optical element 206 aligns with the center of the photodetector 207. It is therefore possible to align the positional relationship of the integrated optical element 206 and the photodetector 207. The dummy photodetector I21 has a larger light receiving area than the main photodetector I22, so that position adjustment is accomplished accurately.

<Generation of Focus Error Signal>

FIGS. 12A and 12B are diagrams illustrating the pattern of the reflected light from the target layer out of focus. Shown in FIGS. 12A and 12B are the diffracted light from Layer 1 which occurs when the objective lens 205 gets out of focus in the direction from Layer 1 to Layer 0 and the diffracted light from Layer 1 which occurs when the objective lens 205 gets out of focus in the direction from Layer 1 to Layer 2. FIG. 12A shows the instance in which the HOE for assembling adjustment and DPD works. FIG. 12B shows the instance in which the HOE for PP works.

The diffracted light from the regions 20*a* to 20*d* and 21*a* to 21*d* gives spots which get blurred while moving in the Rad direction according as the focus point shifts. The diffracted light from the regions 20*e* to 20*h* and 21*e* to 21*h* gives spots which get blurred while moving in the Tan direction according as the focus point shifts. Moreover, the diffracted light from the regions 20*i* to 21*i* gives spots which get blurred while remaining at the same position according as the focus point shifts. As shown in FIGS. 12A and 12B, the diffracted light from the regions 20*a* to 20*d*, 20*i*, and 21*i* gives spots which get blurred equally regardless of whether the focus point shifts toward the Layer 0 or the Layer 2.

The light receiving parts M22, N22, P22, and Q22 detect signals to generate focus error signals (FES) for the double knife edge method. When the objective lens is in true focus on the target layer, all the signals (for FES) detected by the photodetectors M12 to R12 become null, which results in zero FES. When the objective lens gets out of focus toward Layer 0, the light receiving parts N22 and Q22 detect signals in response to the amount of light received. When the objective lens gets out of focus toward Layer 2, the light receiving parts M22 and P22 detect signals in response to the amount of light received. Thus, FES2 is obtained according to the formula (2-1) below from the signals detected by the light receiving parts M22, N22, P22, and Q22.

$$FES2=M22+P22-(N22+Q22) \quad (2\text{-}1)$$

<Generation of Tracking Error Signals for DPD Method>

In the case where the HOE works for assembling adjustment and DPD method, TES for DFPD method and DPD2 are obtained according to the formula (2-2) below from the signals detected by the light receiving parts A20 and D20. Incidentally, the diffracted light from the regions 20*a* and 20*c* is detected by the light receiving part A20 and the diffracted light from the regions 20*b* and 20*d* is detected by the light receiving part D20. Thus, this simplifies the computation of signals.

$$DPD2=A20-D20 \quad (2\text{-}2)$$

<Generation of Tracking Error Signals for Push-Pull Method>

The light receiving parts A20 and D20 detect the AC components of push-pull signals. And, the light receiving parts E20, G20, and H20 detect the DC component of push-pull signals. TES for push-pull method and PPS2 are obtained from these detected signals according to the formula (2-3) below. The diffracted light from the regions 21*a* and 21*b* is detected by the light receiving part A20, the diffracted light from the regions 21*c* and 21*d* is detected by the light receiving part D20, and the diffracted light from the regions 21*e* and 21*f* is detected by the light receiving part E20. This simplifies the computation of signals.

$$PPS2=(A20+E20)-(D20+G20+H20)-kt2\times[E20-(G20+H20)] \quad (2\text{-}3)$$

Here, "kt2" is a constant which has been established so that offset does not occur in PPS2 when the objective lens 205 moves in the Rad direction as the result of tracking action.

FIGS. 13A and 13B are diagrams illustrating the reflected stray light that occurs in the case where the optical disc 100 has three information recording layers and the target layer (for recording and reproducing) is Layer 1. That is, FIGS. 13A and 13B show the reflected stray light from Layer 0 (L0) and Layer 2 (L2). FIG. 13A shows the instance in which the HOE works for assembling adjustment and reproducing from ROM. FIG. 13B shows the instance in which the HOE works for recording and reproducing on and from RE.

The diffracted light from the regions 20*a* to 20*d* and 21*a* to 21*d* moves in the Rad direction as the objective lens gets out of focus. On the other hand, the light receiving parts A20 and D20 are arranged in the Tan direction. Also, the diffracted light from the regions 20*e* to 20*h* and 21*e* to 21*h* move in the Tan direction as the objective lens gets out of focus. On the other hand, the light receiving parts E20 to H20 and the light receiving part for FES are arranged in the Rad direction. Thus, none of the light receiving parts receives the reflected stray light from the out-of-focus layers so long as they have a minimum size just enough to adapt to the shifting of the objective lens 205.

Thus, this embodiment offers the advantage that the reflected stray light from the out-of-focus layers is hardly detected by the light receiving parts for servo control. This leads to generation of stable servo signals.

<Generation of Recording and Reproducing RF Signals>

The light receiving part I22 receives the diffracted light of first order from the regions 20*i* and 21*i*. It generates recording and reproducing RF signals based on signals detected in response to the amount of light received.

Unfortunately, the light receiving part I22 receives the reflected stray light from the out-of-focus layers out of focus unlike the diffracted light for servo signals. To cope with this situation, the light receiving part I22 is juxtaposed with the light receiving parts S20 and S21 of the sub-detector which receive as much stray light as detected by the light receiving part I22. In order that the light receiving parts S20 and S21 of the sub-detector for stray light detect stray light as desired even when the objective lens is shifting, they are arranged perpendicular to the tracking direction of the objective lens 205 and the sub-detector is made to have an adequate size in the tracking direction or Rad direction. In other words, the stray light is not parallel light and hence the stray light moves according as the objective lens moves; therefore, it is necessary that stray light should be received adequately even when the objective lens moves. To meet this requirement, the light receiving parts S20 and S21 of the sub-detector for stray light should have an adequate size in the Rad direction so that they can detect moving stray light. More than one light receiving part for stray light may be arranged around the light receiving part I22 or only one light receiving part for stray light may be arranged at the position perpendicular to the tracking direction (neither shown).

Thus, the reproducing RF signal RFS2 is obtained according to the formula (2-4-1) or (2-4-2) below from the detected signal in response to the amount of light received by the light receiving parts A20 to H20, I22, S20, and S21. (In the case where the HOE works for assembling adjustment and DPD)

$$RFS2=A20+D20+I22-ks2\times(S20+S21) \quad (2\text{-}4\text{-}1)$$

(In the case where the HOE works for PP)

$$RFS2 = A20 + D20 + E20 + G20 + H20 + I22 - ks2 \times (S20 + S21) \quad (2\text{-}4\text{-}2)$$

Here, ks2 is a constant which depends of the areal ratio and relative position of the light receiving parts I22 to S20 and I22 to S21.

The foregoing procedure makes it possible to extract the signal for recording and reproducing on and from the target layer by roughly calculating the component of the reflected stray light detected by the light receiving part I22 and subtracting the thus calculated component from the actually detected signals.

(3) Third Embodiment

Although the third embodiment is similar to the second one, it is so designed as to simplify the HOE for assembling adjustment and DPD, thereby improving the accuracy of HOE fabrication and stabilizing the detection of FES by the knife edge method.

The third embodiment is illustrated in FIGS. 14A to 17B, in which any part identical with that in the first embodiment is given the same reference numeral. Incidentally, the optical information recording and reproducing apparatus 1 and the optical pick-up 102 are constructed in the same way as, in the first embodiment and hence their description is omitted below.

<Structure of the Diffraction Grading>

Figures 14A, 14B:
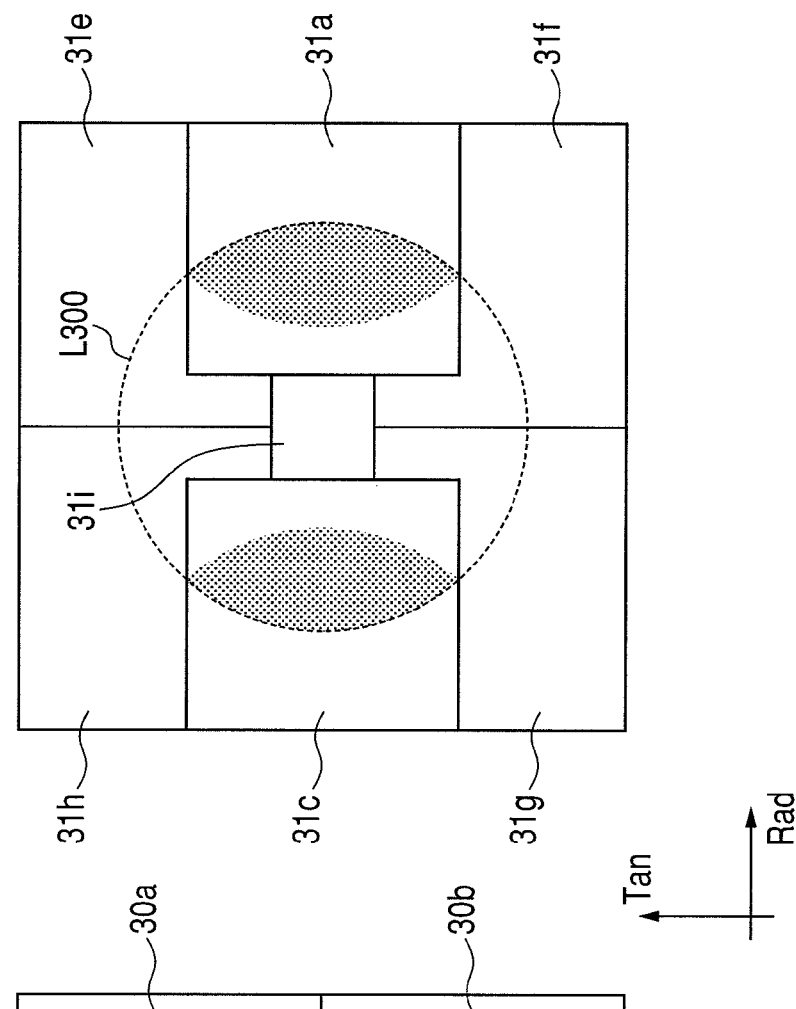
FIGS. 14A and 14B are diagrams illustrating the structure of the diffracting optical element according to the third embodiment.

FIGS. 14A and 14B are diagrams illustrating the structure of the polarized HOE according to the third embodiment of the present invention. To be more specific, FIG. 14A shows the structure of the HOE for tracking control (for assembling adjustment and DPD) by the DPD method, the HOE being necessary at the time of assembling adjustment and BD-ROM reproducing, and FIG. 14B shows the structure of the HOE for tracking control (for PP) by the push-pull method, the HOE being necessary at the time of BD-RE recording and reproducing.

In FIGS. 14A and 14B, the boundaries of the regions 30a to 30d are established such that the reflected light is approximately halved when the center of the reflected light L300 coincides with the center of the HOE. The regions 31a and 31c are separated from each other in such a way that the push-pull pattern in the reflected light L300 (including that which occurs when the objective lens 205 shifts in the Rad direction) entirely passes through them. Also, the boundaries between the regions 31e to 30d and between the regions 31f and 31g are established such that the reflected light L300 is approximately halved when the center of the reflected light L300 coincides with the center of the HOE.

The light passing through the regions 30a to 30d shown in FIG. 14A becomes no diffracted zeroth ordered light and plus/minus first order in the Tan direction, and the diffracted light from these regions range in the plus/minus Rad directions. The light passing through the regions 31a and 31c shown in FIG. 14B becomes either diffracted light of plus first order or minus first order in the Tan direction. The following description is concerned with the instance in which the light passing through the region 31a becomes diffracted light of minus first order in the Tan direction and the light passing through the region 31c becomes diffracted light of plus first order in the Tan direction. Also, the HOE shown in FIG. 14B is constructed such that the difference varies from the center O300 to the focusing position of the diffracted light from the regions 31a and 31c. This structure prevents the light receiving part from receiving the diffracted light of specific order which is not essentially necessary even though the HOE is poor in manufacturing accuracy.

The light passing through the regions 31e to 31h becomes diffracted light of plus/minus first order in the Tan direction, and the diffracted light from these regions ranges in the Rad direction.

The diffracted light of plus first order from the regions 30a to 30d and the regions 31e to 31h is detected as the signal to generate FES. Incidentally, the no diffracted zeroth ordered light that has passed through the HOE for assembling adjustment and DPD is detected as the signal for assembling adjustment, and the diffracted light of minus first order is used as reproducing RFS. At this time, the no diffracted zeroth ordered light should have a minimum intensity that can be detected by the dummy photodetector. For example, a ratio of 30:5:65 should be established for the intensity of diffracted light of plus first order, zeroth order, and minus first order.

<Structure of the Photodetector>

FIGS. 15A and 15B are diagrams illustrating the structure of the photodetector according to the third embodiment of the present invention. Here, the light receiving parts of the main photodetector are denoted by A30, C32, E30, G30, H30, I32, M32, N32, P32, and Q32. The light receiving part of the dummy photodetector is denoted by I31. The light receiving parts of the sub-detector for stray light are denoted by S30 and S31. The light receiving parts of the photodetector are arranged in the same way as in the case where the HOE works for assembling adjustment and DPD or the HOE works for PP.

TES is generated bases on the signals detected in response to the amount of light received by the light receiving parts A30, C32, E30, G30, and H30. FES is generated based on the signals detected in response to the amount of light received by the light receiving parts M32, N32, P32, and Q32. Incidentally, the light receiving parts of the main photodetector should be of the minimum size which just corresponds to the shift plus/minus hundreds of µm of the objective lens 205.

When the optical axis of the reflected light L300, the center of the integrated optical element 206, and the center O300 of the photodetector 207 coincide with one another, the diffracted light of minus first order from the regions 30a, 30c, 31e, and 31f focuses at the light receiving part E30 so that it is detected. Incidentally, the light receiving part E30 is able to receive the diffracted light from different regions in the HOE. This simplifies the structure of the photodetector 207 and the computation of signals. The foregoing arrangement may be modified as follows. In order for the light receiving part E30 to have the same response characteristics as the light receiving parts G30 and H30, the light receiving parts (E30) and (F30), indicated by dotted lines in FIG. 15, are provided, which have the same size as the light receiving parts G30 and H30. The light receiving parts (E20) and (F20) are placed respectively at the positive position and at the negative position in the Rad direction on the same axis of the light receiving parts G30 and H30. The light receiving parts (E30) and (F30) receive respectively the diffracted light of minus first order from the regions 30a and 31e and the diffracted light of minus first order from the regions 30c and 31f.

The diffracted light of minus first order from the regions 30b and 31g focuses for detection at the center of the light receiving part G30; the diffracted light of minus first order from the regions 30d and 31h focuses for detection at the center of the light receiving part H30; the diffracted light of minus first order from the region 31a focuses for detection at the center of the light receiving part A30; and the diffracted light of minus first order from the region 31c focuses for detection at the center of the light receiving part C32.

The diffracted light of plus first order from the regions 30a, 31e, 30d, and 31h ranges in the Rad direction at just an intermediate point between the light receiving parts P32 and Q32, in such a way that the diffracted light from the regions 30a and 31e focuses inside (as viewed from the center O300) and the diffracted light from the regions 30d and 31h focuses outside (as viewed from the center O300).

The diffracted light of plus first order from the regions 30b, 31f, 30c, and 31g ranges in the Rad direction at just an intermediate point between the light receiving parts M22 and N22, in such a way that the diffracted light from the regions 30b and 31f focuses inside (as viewed from the center O300) and the diffracted light from the regions 30c and 31g focuses outside (as viewed from the center O300).

Also, the diffracted light of plus first order from the regions 30a to 30d and 31e to 31h is detected by the light receiving parts M32, N32, P32, and Q32 when the target layer is out of focus. In the case where the HOE works for PP, the light receiving parts M32, N32, P32, and Q32 for FES detection should preferably be arranged at positions away more than the distance between the center O300 and the focusing position of the regions 31a to 31d. In this way it is possible to prevent the light receiving parts from receiving the reflected stray light from the out-of-focus layers and to detect stable FES.

On the other hand, when the HOE works for assembling adjustment and DPD, the no diffracted zeroth ordered light that passes through the HOE focuses for detection at the center of the light receiving part I31 of the dummy photodetector, and the diffracted light of plus first order from the region 31i focuses for detection at the center of the light receiving part I32. The dummy photodetector is used only for assembling adjustment, and the signals detected by the light receiving part I32 and the light receiving part I31 of the dummy photodetector are used for feedback control for assembling adjustment, in the same way as in the first and second embodiments.

<Generation of Focus Error Signal>

FIGS. 16A and 16B are diagrams illustrating the pattern of the reflected light from the target layer out of focus according to the third embodiment. Shown in FIGS. 16A and 16B are the diffracted light from Layer 1 which occurs when the objective lens 205 gets out of focus in the direction from Layer 1 to Layer 0 and the diffracted light from Layer 1 which occurs when the objective lens 205 gets out of focus in the direction from Layer 1 to Layer 2. FIG. 16A shows the instance in which the HOE for assembling adjustment and DPD works. FIG. 12B shows the instance in which the HOE for PP works.

The diffracted light from the regions 30a to 30d gives focused spots which get blurred around the focusing position of the objective lens 205 in focus with the target layer. The diffracted light from the regions 31e and 31c gives focused spots which get blurred while moving in the Rad direction according as the focus point shifts. Further, the diffracted light from the regions 31e to 31h gives focused spots which get blurred while moving in the Tan direction. The no diffracted zeroth ordered light from the HOE for assembling adjustment and ROM and the diffracted light from the region 31i give focused spots which get blurred while remaining at the same position.

As shown in FIGS. 16A and 16B, the no diffracted zeroth ordered light for assembling adjustment and ROM and the diffracted light from the region 31i give focused spots which get blurred equally regardless of whether the focus point shifts toward Layer 0 or Layer 2.

The light receiving parts M32, N32, P32, and Q32 detect signals to generate focus error signal FES for the double-knife edge method. When the objective lens just comes in focus on the target layer, all the signals detected by the light receiving parts M32 to Q32 for FES become null and the resulting FES is 0. When the objective lens moves out of focus toward Layer 0, the light receiving parts N32 and Q32 detect signals in response to the amount of light received. When the objective lens moves out of focus toward Layer 2, the light receiving parts M32 and P32 detect signals in response to the amount of light received.

Thus, FES3 is obtained according to the formula (3-1) below from the signals detected by the light receiving parts M32, N32, P32, and Q32 in response to the amount of light received.

$$FES3 = M32 + P32 - (N32 + Q32) \quad (3\text{-}1)$$

<Generation of Tracking Error Signals for DPD Method>

In the case where the HOE works for assembling adjustment and DPD, TES for DPD and DPD3 are obtained according to the formula (3-2) from the signals detected in response to the amount of light received by the light receiving parts E30, G30, and H30. Incidentally, the diffracted light from the regions 30a and 30c is detected altogether by the light receiving part E30, and hence this simplifies the computation of signals.

$$DPD3 = E30 - (G30 + H30) \quad (3\text{-}2)$$

<Generation of Tracking Error Signals for Push-Pull Method>

The light receiving parts A30 and C32 detect signals to generate the AC component of push-pull signal. The light receiving parts E30, G30, and H30 detect signals to generate the DC component of push-pull signal. TES for push-pull method and PPS3 are obtained from these detected signals according to the formula (3-3) below. The diffracted light from the regions 31e and 31f is detected altogether by the light receiving part E30, and this simplifies the computation of signals.

$$PPS3 = (A30 + E30) - (C32 + G30 + H30) - kt3 \times \{E30 - (G30 + H30)\} \quad (3\text{-}3)$$

Here, "kt3" is a constant which has been established so that offset does not occur in PPS3 when the objective lens 205 moves in the Rad direction as the result of tracking action.

Figure 17A:
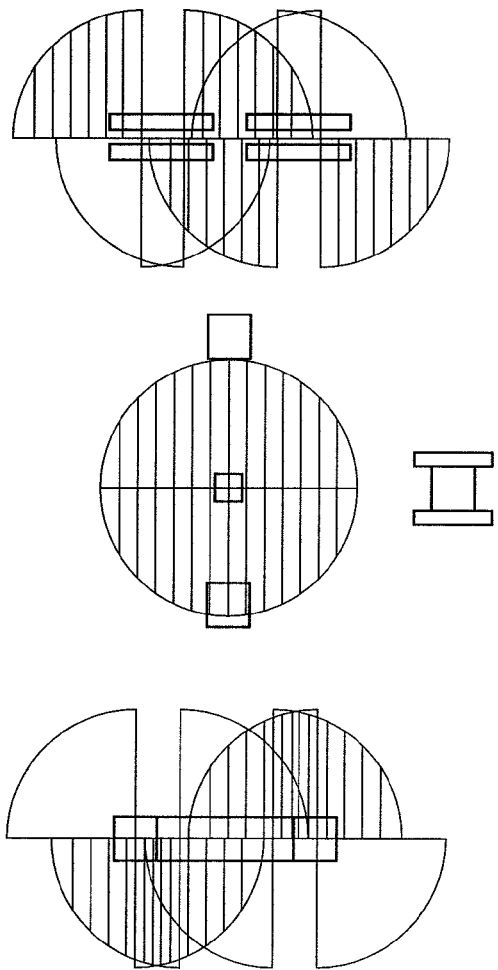
FIGS. 17A and 17B are diagrams illustrating the position where the reflected stray light from the out-of-focus layer impinges on the photodetector, according to the third embodiment.
Figure 17B:
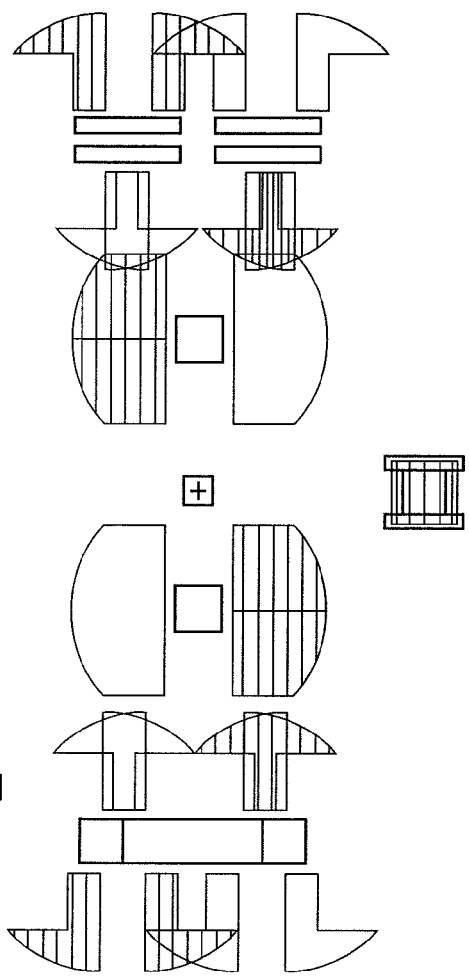

FIGS. 17A and 17B are diagrams illustrating the reflected stray light from two out-of-focus layers of the optical disc 100 having three information recording layers, in which the target layer is Layer 1 and the out-of-focus layers are Layer 0 and Layer 2. FIG. 17A shows the reflected stray light in the case where the HOE works for assembling adjustment and recording and reproducing by DPD. FIG. 17B shows the reflected stray light in the case where the HOE works for recording and reproducing by PP.

In the case where the HOE for PP works as shown in FIG. 17B, the diffracted light from the regions 31a and 31c moves in the Rad direction as the target layer gets out of focus and the diffracted light from the regions 31e to 31h moves in the Tan direction as the target layer gets out of focus. However, since the light receiving parts E30 to H30 and the light receiving part for FES are arranged in the Rad direction, the reflected stray light from the out-of-focus layers does not enter the light receiving parts so long as the light receiving parts of the main photodetector have a minimum size just enough to adapt to the shifting of the objective lens 205. Thus, the reflected stray light from the out-of-focus layers is hardly detected by the light receiving parts for servo control. This leads to generation of stable servo signals.

On the other hand, in the case where the HOE for assembling adjustment and DPD works and performs recording and reproducing, as shown in FIG. 17A, the reflected stray light from the out-of-focus layers also enters the light receiving parts E30 to H30 and the light receiving part for FES. However, since the light from the target layer has a high intensity which fluctuates sufficiently slowly due to interference, it is considered that influence is less significant than in the case of R/RE recording and reproducing.

<Generation of Recording and Reproducing RF Signals>

The light receiving part I32 receives the diffracted light of first order from the region 31$i$, and recording and reproducing RF signals are generated in response to the amount of light received.

Unfortunately, the light-receiving part I32 receives the reflected stray light from the out-of-focus layers out of focus unlike the diffracted light for servo signals. To cope with this situation, the light receiving part I32 is juxtaposed with the light receiving parts S30 and S31 of the sub-detector which receive as much stray light as detected by the light receiving part I32. The light receiving parts S30 and S31 of the sub-detector for stray light conform to the same specification as used in the first and second embodiments.

Thus, the reproducing RF signal RFS3 is obtained according to the formula (3-4-1) or (3-4-2) below from the detected signal in response to the amount of light received by the light receiving parts A30, C32, E30 to H30, I32, S30, and S31.

(In the case of HOE for assembling adjustment and ROM)

$$RF3 = E30 + G30 + H30 \quad (3\text{-}4\text{-}1)$$

(In the case of HOE for RE)

$$RF3 = A30 + C32 + E30 + G30 + H30 + I32 - ks3 \times (S30 + S31) \quad (3\text{-}4\text{-}2)$$

Here, "ks3" is a constant which depends of the areal ratio and relative position of the light receiving parts I32, S30, and S31.

The foregoing procedure makes it possible to extract the signal for recording and reproducing on and from the target layer by roughly calculating the component of the reflected stray light detected by the light receiving part I32 and subtracting the thus calculated component from the actually detected signals if the HOE works for PP (because I32 is used only when the HOE works for PP).

(4) Fourth Embodiment

Although the fourth embodiment is similar to the third one, it is provided with the main photodetector and sub-photodetector for reception of diffracted light of zeroth order from the HOE for assembling adjustment and DPD. Thus, it employs the diffracted light of zeroth order with a high intensity for RFS detection, thereby reducing influence by the reflected stray light from the out-of-focus layers. Further, the high intensity of the no diffracted zeroth ordered light facilitates the manufacture of diffraction gratings. This improves the manufacturing accuracy of the HOE.

<Structure of the Diffraction Grading>

The HOE according to the fourth embodiment of the present invention is identical with the one according to the third embodiment, as shown in FIGS. 14A and 14B. Therefore, its detailed description is omitted.

According to the fourth embodiment, when light passes through the HOE for assembling adjustment and DPD, the diffracted light of plus first order from the regions 30$a$ to 30$d$ is detected as FES, the no diffracted zeroth ordered light is detected as RFS for assembling adjustment, and the diffracted light of minus first order is detected as signal for assembling adjustment. The no diffracted zeroth ordered light should preferably have a certain degree of intensity because it is used also as RFS unlike the third embodiment; by contrast, the diffracted light of minus first order may have a minimum intensity because it is used only for assembling adjustment.

Thus, a ratio of 25:70:5, for example, should be established for the intensity of diffracted light of plus first order, zeroth order, and minus first order.

<Structure of the Photodetector>

FIGS. 18A and 18B are diagrams illustrating the structure of the photodetector according to the fourth embodiment of the present invention. The difference from the third embodiment is that the light receiving part I41 is the light receiving part of the main photodetector and the light receiving parts S40 and S41 are the sub-light receiving parts for stray light, and no dummy photodetector exists.

In the case where the HOE works for PP, the fourth embodiment is identical with the third embodiment; therefore, its description is omitted. On the other hand, in the case where the HOE works for assembling adjustment and DPD, the no diffracted zeroth ordered light that passes through it focuses at the light receiving part I41 of the main photodetector. Also, the reflected stray light from the out-of-focus layers is detected by the light receiving parts S40 and S41 of the sub-photodetector.

<Generation of Recording and Reproducing RF Signals>

In the case where the HOE works for assembling adjustment and DPD, the signals detected by the light receiving parts A30 and C30 are not used and hence the reflected stray light of zeroth order from the out-of-focus layers only affects the signals detected by the light receiving part I41.

Consequently, the signals detected by the light receiving parts S40 and S41 of the sub-photodetector for stray light are used. In this way it is possible to reduce the influence of the reflected stray light from the out-of-focus layers at the light receiving part I41.

Incidentally, the light receiving parts S40 and S41 of the sub-detector for stray light conform to the same specification as that for the first to third embodiments.

Therefore, the reproducing RF signals FFS4 can be obtained according to the formulas (4-1-1) and (4-1-2) below based on the signals detected by the light receiving parts A30, C32, E30 to H30, I32, S30, S31, I40, S40, and S41.

(In the case of HOE for assembling adjustment and ROM (DPD))

$$RFS4 = I41 - ks4 \times (S40 + S41) \quad (4\text{-}4\text{-}1)$$

(In the case of HOE for RE (PP))

$$RFS4 = A30 + C32 + E30 + G30 + H30 + I32 - ks4 \times (S30 + S31) \quad (4\text{-}4\text{-}2)$$

Here, "ks4" is a constant which depends of the areal ratio and relative position of the light receiving parts I32, S30, and S31 and the light receiving parts I41, S40, and S41.

The foregoing procedure makes it possible to extract the signal for recording and reproducing on and from the target layer by roughly calculating the component of the reflected stray light detected by the light receiving part I41 and subtracting the thus calculated component from the actually detected signals if the HOE works for assembling adjustment and DPD (ROM).

Incidentally, the fourth embodiment is identical with the third embodiment in the detection of RFS in the case where the HOE works for PP and also in the detection of FES and TES in the case where the HOE works for both. Therefore, its description is omitted.

What is claimed is:

1. An optical pick-up comprising:
    an objective lens to direct light from a light source toward an information recording layer of an optical recording medium;
    a diffracting optical element to divide reflected light from the optical recording medium into multiple light beams and diffract them; and
    a photodetector to receive the light beams which have been diffracted by the diffracting optical element,
    the photodetector being composed of a first photodetecting part to detect first diffracted light which is diffracted light generated by the diffracting optical element and diffracted light in the central region of the reflected light, and a second photodetecting part to detect second diffracted light which is diffracted light in the central region of the reflected light and diffracted light differing in order from the first diffracted light, and
    the photodetector outputting a first detected signal which is in response to the amount of the second diffracted light detected and which generates a signal for assembling adjustment, and a second detected signal which is in response to the amount of the first diffracted light detected and which generates a signal for information recording and reproducing and feedback control.

2. The optical pick-up according to claim 1, wherein the diffracting optical element has a first region which diffracts the light in the central region of the reflected light from the optical recording medium in the radial direction (Rad direction) of the optical recording medium and generates the first and second diffracted light in such a way that the intensity of the first diffracted light is higher than the intensity of the second diffracted light.

3. The optical pick-up according to claim 2, wherein the diffracting optical element has a second region which passes all of the push-pull patterns contained in the reflected light and diffracts the light passing through the second region in the tracking direction (Tan direction) of the optical recording medium, thereby generating third diffracted light to be used for generating focus error signals and also generating fourth diffracted light to be used for generating an AC component of tracking error signals.

4. The optical pick-up according to claim 3, wherein a third region in addition to the first and second regions in the diffracting optical element diffracts the reflected light in the Tan direction, thereby generating fifth and sixth diffracted light to be used for generating a DC component of tracking error signals.

5. The optical pick-up according to claim 1, wherein the photodetector has a third photodetecting part which detects stray light from out-of-focus layers of an optical recording medium having multiple information recording layers and outputs a third detected signal to calculate stray light components.

6. The optical pick-up according to claim 4,
    wherein the photodetector has fourth to seventh photodetecting parts which detect respectively the third to sixth diffracted light, and
    wherein the fourth to seventh photodetecting parts are arranged such that they do not receive reflected stray light from out-of-focus layers in an optical recording medium having multiple information recording layers but receive only reflected light from a target layer.

7. The optical pick-up according to claim 1, wherein the diffracting optical element has first and second functions and the optical pick-up further has a switching element which switches the first function to and from the second function of the diffracting optical element such that when the first function is selected, the photodetector outputs a first detected signal which is in response to the amount of the second diffracted light detected and which generates a signal for assembling adjustment, and when the second function is selected, the photodetector outputs a second detected signal which is in response to the amount of the first diffracted light detected and which generates a signal for information recording and reproducing and for feedback control.

8. An optical pick-up comprising:
    an objective lens to direct light from a light source toward an information recording layer of an optical recording medium;
    a diffracting optical element which divides reflected light from the optical recording medium into multiple light beams and diffracts them and has a first and second functions;
    a switching element to switch the first function to and from the second function of the diffracting optical element; and
    a photodetector to receive light beams diffracted by the diffracting optical element,
    wherein, when the first function is selected, the photodetector outputs a first detected signal which is in response to the amount of the first and second diffracted light detected and which generates a signal for assembling adjustment, or the photodetector outputs a second detected signal for information recording and reproducing in response to the amount of the first diffracted light detected, and
    wherein, when the second function is selected, the photodetector outputs a third detected signal which is in response to the amount of the first diffracted light detected and which generates a signal for information recording and reproducing and feedback control.

9. The optical pick-up according to claim 8, wherein the photodetector has a third photodetecting part which detects reflected stray light from out-of-focus layers in an optical recording medium having multiple information recording layers and which outputs a fourth detected signal for calculation of astray light component.

10. An optical pick-up comprising:
    an objective lens to direct light from a light source toward an information recording layer of an optical recording medium;
    a diffracting optical element which divides reflected light from the optical recording medium into multiple light beams and diffracts them and has first and second functions;
    a switching element to switch the first function to and from the second function of the diffracting optical element; and
    a photodetector to receive light beams diffracted by the diffracting optical element,
    wherein the diffracting optical element divides the reflected light into multiple light beams and diffract them when it achieves the first function and diffracts the light in the central region of the reflected light in a direction different from that of the light in other regions when it achieves the second function,
    wherein the photodetector has a first photodetecting part to detect no diffracted zeroth ordered light (first diffracted light) of the diffracting optical element in the case where it achieves the first function, a second photodetecting part to detect diffracted light of any order other than zeroth order (second diffracted light), which is diffracted light in the central region of the reflected light of the diffracting optical element in the case where it achieves the second function, a third photodetecting part which detects diffracted light of any order other than zeroth order (third diffracted light) of the diffracting element which achieves the first function and which also detects diffracted light of any order other than zeroth order and different from the order of the second diffracted light (fourth diffracted light) which is diffracted light of the diffracting optical element which achieves the second function, wherein, when the first function is selected, the photodetector outputs a first detected signal which is in response to the amount of the first diffracted light detected and which generates a signal for assembling adjustment, or the photodetector outputs a second detected signal for information recording and reproducing and feedback control in response to the amount of the third diffracted light detected, and wherein, when the second function is selected, the photodetector outputs a third detected signal which is in response to the amount of the second and fourth diffracted light detected and which generates a signal for information recording and reproducing and feedback control.

* * * * *